US012596812B2

(12) United States Patent
Inokuchi

(10) Patent No.: US 12,596,812 B2
(45) Date of Patent: Apr. 7, 2026

(54) ATTACK ROUTE EXTRACTION SYSTEM, ATTACK ROUTE EXTRACTION METHOD, AND PROGRAM

(71) Applicant: NEC Corporation, Tokyo (JP)

(72) Inventor: Masaki Inokuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 65 days.

(21) Appl. No.: 18/697,775

(22) PCT Filed: Nov. 16, 2021

(86) PCT No.: PCT/JP2021/042120
§ 371 (c)(1),
(2) Date: Apr. 2, 2024

(87) PCT Pub. No.: WO2023/089669
PCT Pub. Date: May 25, 2023

(65) Prior Publication Data
US 2025/0238523 A1    Jul. 24, 2025

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .. G06F 21/577; G06F 21/57; G06F 2221/034; G06F 21/56; G06Q 10/0635; H04L 63/1425; H04L 63/20
See application file for complete search history.

(56) References Cited

U.S. PATENT DOCUMENTS

| | | | | |
|---|---|---|---|---|
| 9,100,431 | B2* | 8/2015 | Oliphant | H04L 63/1433 |
| 9,239,926 | B2* | 1/2016 | Tripp | H04L 9/005 |
| 9,507,944 | B2* | 11/2016 | Lotem | G06F 21/577 |
| 11,108,790 | B1* | 8/2021 | Deardorff | H04L 41/142 |

(Continued)

FOREIGN PATENT DOCUMENTS

| | | |
|---|---|---|
| JP | 2019-050477 A | 3/2019 |
| WO | 2018/134909 A1 | 7/2018 |

(Continued)

OTHER PUBLICATIONS

International Search Report for PCT Application No. PCT/JP2021/042120, mailed on Feb. 8, 2022.

*Primary Examiner* — Hosuk Song
(74) *Attorney, Agent, or Firm* — Sughrue Mion, PLLC

(57) ABSTRACT

An attack route extraction system includes a functional part which extracts one or more attack steps that can be performed by a system to be diagnosed according to configuration information of the system to be diagnosed; a cost setting part which sets a cost to the attack step based on at least one piece of information of threat information, attack content information, countermeasure possibility information based on countermeasure information corresponding to an attack method; and an attack route extraction part which determines a priority of each attack route acquired by concatenating the one or more attack steps from an intrusion point to an attack target of the system to be diagnosed based on the cost of the attack step set by the cost setting part and extracts the one or more attack route in a descending order of the priority.

10 Claims, 18 Drawing Sheets

(56)     References Cited

U.S. PATENT DOCUMENTS

| | | | |
|---|---|---|---|
| 11,403,427 B2 * | 8/2022 | Potteiger | G06F 11/302 |
| 11,847,227 B2 * | 12/2023 | Tsirkin | G06F 21/57 |
| 12,299,120 B2 * | 5/2025 | Strogov | G06F 21/554 |
| 2020/0320191 A1 | 10/2020 | Asai et al. | |
| 2021/0397702 A1 | 12/2021 | Amano et al. | |
| 2021/0400079 A1 | 12/2021 | Amano et al. | |
| 2022/0191220 A1 | 6/2022 | Nagatani | |
| 2023/0017839 A1 | 1/2023 | Mizushima et al. | |

FOREIGN PATENT DOCUMENTS

| | | | |
|---|---|---|---|
| WO | 2020/189668 A1 | 9/2020 |
| WO | 2020/189669 A1 | 9/2020 |
| WO | 2020/195228 A1 | 10/2020 |
| WO | 2021/130943 A1 | 7/2021 |

* cited by examiner

FIG. 2

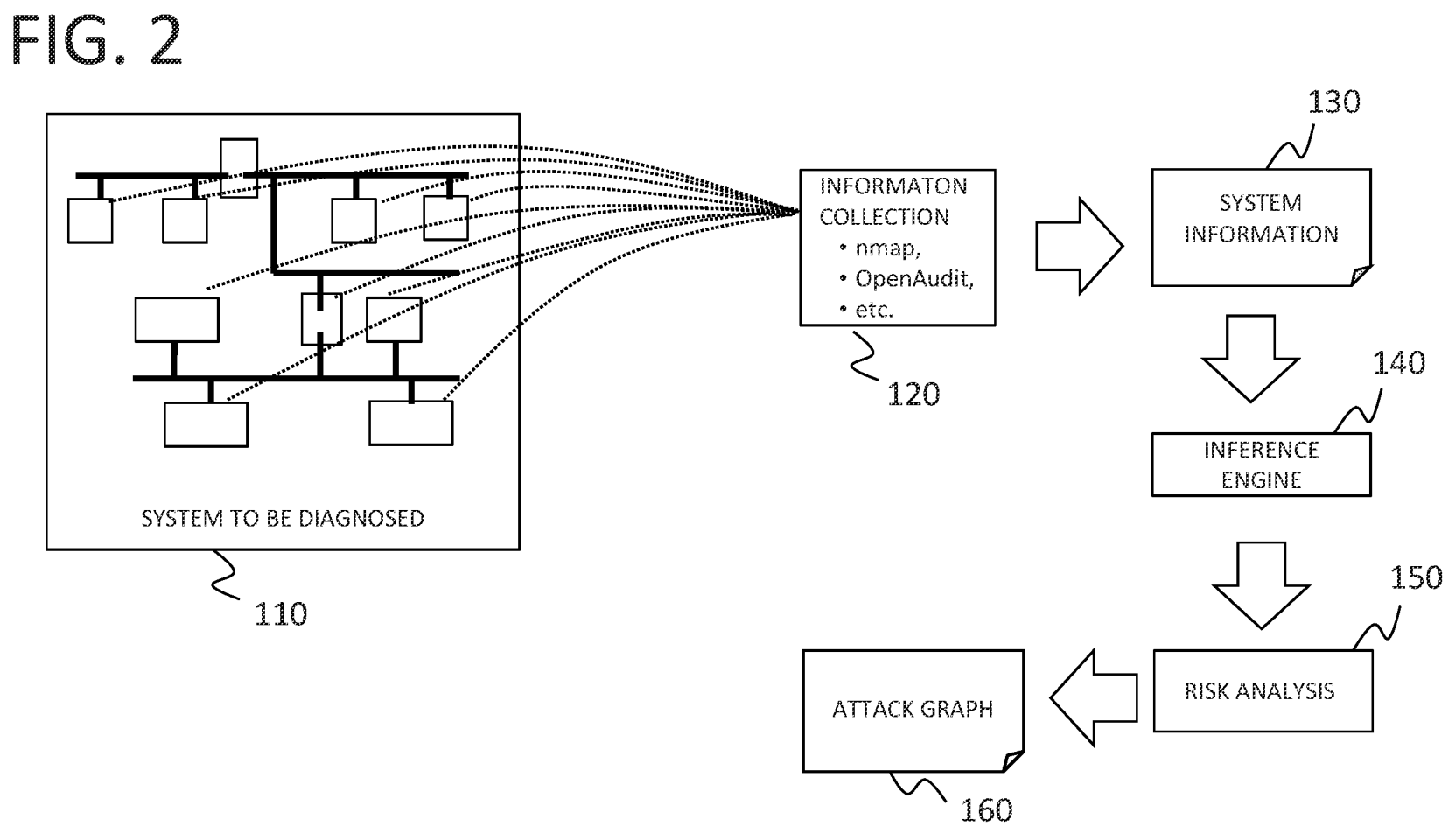

130 — SYSTEM INFORMATION

140 — INFERENCE ENGINE

150 — RISK ANALYSIS

160 — ATTACK GRAPH

120 — INFORMATON COLLECTION
- nmap,
- OpenAudit,
- etc.

110 — SYSTEM TO BE DIAGNOSED

ONE EXAMPLE OF ATTACK GRAPH ACQUIRED BY RISK ANALYSIS

SIMPLIFIED ATTACK GRAPH ACQUIRED BY RISK ANALYSIS

FIG. 8

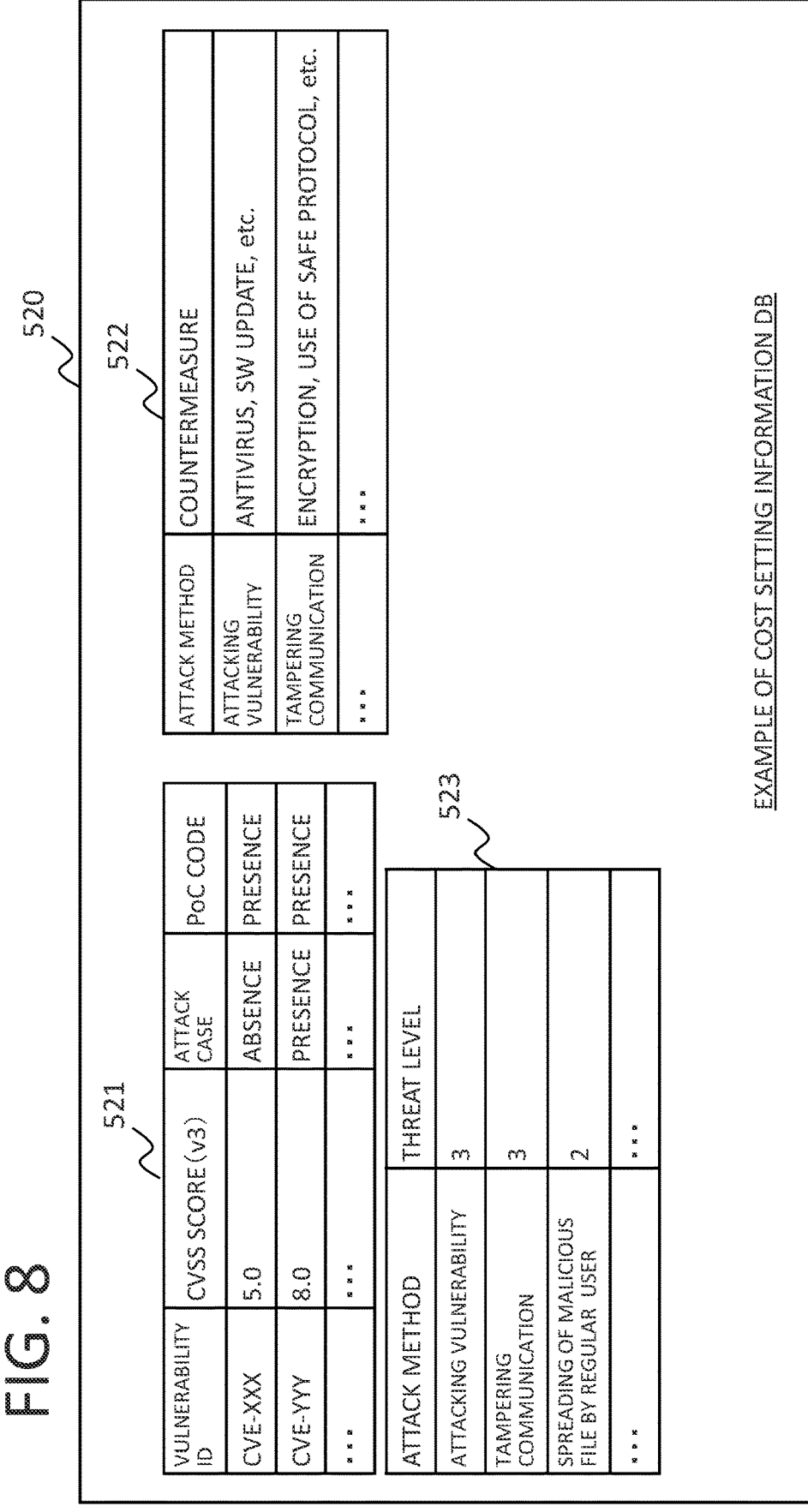

521

| VULNERABILITY ID | CVSS SCORE (v3) | ATTACK CASE | PoC CODE |
|---|---|---|---|
| CVE-XXX | 5.0 | ABSENCE | PRESENCE |
| CVE-YYY | 8.0 | PRESENCE | PRESENCE |
| ... | ... | ... | ... |

522

| ATTACK METHOD | COUNTERMEASURE |
|---|---|
| ATTACKING VULNERABILITY | ANTIVIRUS, SW UPDATE, etc. |
| TAMPERING COMMUNICATION | ENCRYPTION, USE OF SAFE PROTOCOL, etc. |
| ... | ... |

523

| ATTACK METHOD | THREAT LEVEL |
|---|---|
| ATTACKING VULNERABILITY | 3 |
| TAMPERING COMMUNICATION | 3 |
| SPREADING OF MALICIOUS FILE BY REGULAR USER | 2 |
| ... | ... |

EXAMPLE OF COST SETTING INFORMATION DB

520

1100

SET TO 1 WHEN LEVEL OF THREAT IS 1

SET TO 1 WHEN LEVEL OF THREAT IS 2

SET TO 1 WHEN LEVEL OF THREAT IS 3

ATTACK DESTINATION HOST ID (000～999)

1109

1108 VALUE IS SET ACCORDING TO PRIVILEGES OF ATTACK SOURCE - ATTACK DESTINATION

1107

1106

1104  1105

1103

1102

1101

SET TO 1 WHEN REMOTE ATTACK

SET TO 1 WHEN ATTACK DESTINATION IS NOT ATTACK TARGET

COMPUTER 9000

CPU 9010

COMMUNICATION INTERFACE 9020

9030

MEMORY

AUXILIARY STORAGE DEVICE 9040

ATTACK ROUTE EXTRACTION SYSTEM, ATTACK ROUTE EXTRACTION METHOD, AND PROGRAM

This application is a National Stage Entry of PCT/JP2021/042120 filed on Nov. 16, 2021, the contents of all of which are incorporated herein by reference, in their entirety.

The present invention relates to an attack route extraction system, an attack route extraction method, and a program.

BACKGROUND

In a risk analysis of a system to be diagnosed, it is performed to extract one or more attack routes including information of one or more attack methods, one or more attack conditions and one or more hosts which are passed from an intrusion point to an attack target based on various configuration information at a time of analysis. An attack graph is extracted by collecting information of configuration information of a system to be diagnosed, extracting system information, performs a risk analysis by an inference engine. An attack graph acquired by a risk analysis includes one or more attack conditions and one or more attack methods. Each stage in which a different state is reached by an attack method is called an attack step. An attack route is one acquired by concatenating each attack step (an edge indicating an attack method).

Patent Literature (PTL) 1 relates to a risk analysis result display apparatus by which a change in a risk in a system can be understood.

PTL 2 relates to an information processing apparatus which designates a combination of countermeasure candidates to be applied for each combination of attack activities.

PTL 3 relates to an incident analysis apparatus which can identify an estimated attack even if a plurality of estimated attacks are found.

PTL 1: WO2021/130943A1
PTL 2: JPWO2018/134909
PTL 3: Japanese Patent Kokai Publication No: 2019-050477

SUMMARY

Technical Problem

The following analysis has been given by the present invention. For example, as shown in FIG. 5 by an example, it is assumed to have a configuration in which a system to be diagnosed includes hosts A, B, C, D, E and F, in which the hosts A and B, C and D, and E and F are respectively connected by networks, in which there is a firewall FW between (A and B) and (C and D) and there is a firewall FW between (C and D) and (E and F). It is also assumed that an access from A or B to C or D are allowed and an access from C or D to E or F are allowed. An attack graph is extracted by analyzing configuration information of a system to be diagnosed. It is assumed that attack source nodes and attack destination nodes A, B, C, D, E and F in an attack graph correspond to the hosts A, B, C, D, E and F. In this case, as shown below, attack rotes are acquired by extracting all the attack routes each of which concatenates attack steps (edges), from an attack graph. Note that attack methods are omitted in this example.

A, B, C, D, E, F
A, B, C, D, F
A, B, C, E, F
A, B, C, F
A, B, D, C, E, F

A, B, D, C, F
A, B, D, E, F
A, B, D, F
A, C, D, E, F
A, C, D, F
A, C, E, F
A, C, F
A, D, C, E, F
A, D, C, F
A, D, E, F
A, D, F

In this way, it is possible to show each attack route by enumerating nodes in a sequential order.

In order to perform a security risk diagnosis, there is a demand of output in a form of attack routes in place of an attack graph. However, if all the attack routes included in an attack graph acquired by configuration information of a system to be diagnosed are enumerated, a number of attack routes becomes enormous whereby it become difficult to understand all the security risks from the enumerated attack routes.

It is an object of the present invention to provide an attack route extraction system, an attack route extraction method, and a program which contribute to extract one or more attack routes suitable for performing a security risk diagnosis from an attack graph.

Solution to Problem

According to a first aspect of the present invention, there is provided an attack route extraction system, comprising:
a functional part which extracts one or more attack steps that can be performed by a system to be diagnosed according to configuration information of the system to be diagnosed;
a cost setting part which sets a cost to the attack step based on at least one piece of information of threat information, attack content information, countermeasure possibility information based on countermeasure information corresponding to an attack method; and
an attack route extraction part which determines a priority of each attack route acquired by concatenating the one or more attack steps from an intrusion point to an attack target of the system to be diagnosed based on the cost of the attack step set by the cost setting part and extracts the one or more attack route in a descending order of the priority.

According to a second aspect of the present invention, there is provided an attack route extraction method performed by a computer including a processor and a memory, comprising:
extracting one or more attack steps that can be performed by a system to be diagnosed according to configuration information of the system to be diagnosed;
setting a cost to the attack step based on at least one piece of information of threat information, attack content information, countermeasure possibility information based on countermeasure information corresponding to an attack method; and
determining a priority of each attack route acquired by concatenating the one or more attack steps from an intrusion point to an attack target of the system to be diagnosed based on the cost of the attack step set by the cost setting and extracting the one or more attack route in a descending order of the priority.

According to a third aspect of the present invention, there is provided a program which causes a computer to perform processings of:

extracting one or more attack steps that can be performed by a system to be diagnosed according to configuration information of the system to be diagnosed;

setting a cost to the attack step based on at least one piece of information of threat information, attack content information, countermeasure possibility information based on countermeasure information corresponding to an attack method; and determining a priority of each attack route acquired by concatenating the one or more attack steps from an intrusion point to an attack target of the system to be diagnosed based on the cost of the attack step set by the processing of setting a cost and extracting the one or more attack route in a descending order of the priority. Note, this program can be recorded in a computer-readable storage medium. The storage medium can be non-transitory one, such as a semiconductor memory, a hard disk, a magnetic recording medium, an optical recording medium, and so on. The present invention can be realized by a computer program product.

According to the present invention, it is possible to provide an attack route extraction system, an attack route extraction method, and a program which contribute to extract one or more attack routes suitable for performing a security risk diagnosis from an attack graph.

BRIEF DESCRIPTION OF DRAWINGS

FIG. 2 is a diagram illustrating an outline of a system which performs a security risk diagnosis of a system to be diagnosed.

FIG. 8 is a diagram illustrating an example of content of information stored in a cost setting information database (DB) according to the first example embodiment of the present invention.

FIG. 14 is a diagram illustrating an example of a schematic configuration of an attack route extraction part of the attack route extraction system according to the first example embodiment of the present invention.

FIG. 17 is a diagram illustrating an outline of a method for extracting an attack route according to the second example embodiment of the present invention.

FIG. 18 is a diagram illustrating a configuration of a computer which can make up an attack route extraction system according to the present invention.

EXAMPLE EMBODIMENTS

Figure 1:
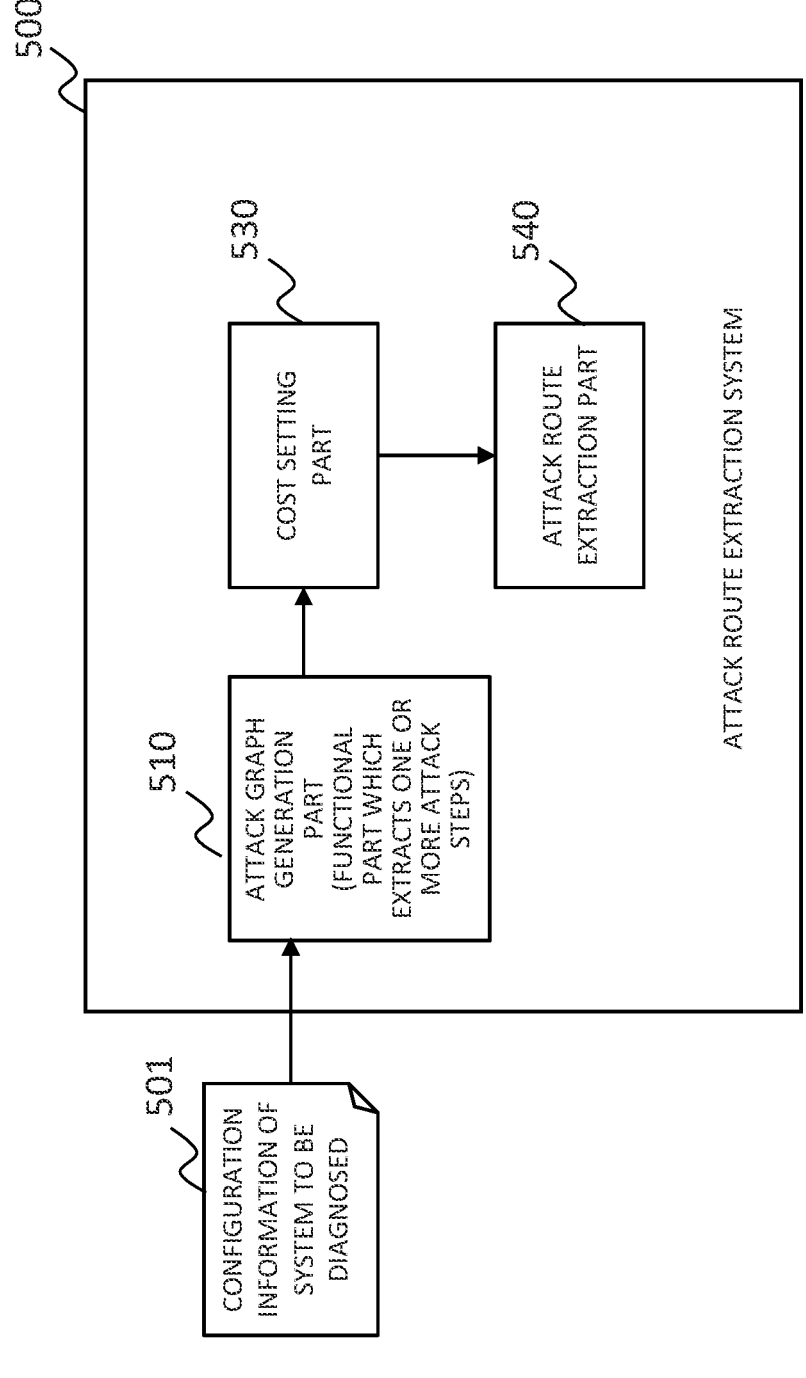
FIG. 1 is a diagram illustrating an example of a schematic configuration of an attack route extraction system according to an example embodiment of the present invention.

First, an outline of an example embodiment of the present invention will be described with reference to drawings. Note, in the following outline, reference signs of the drawings are denoted to each element as an example for the sake of convenience to facilitate understanding and the drawings are not intended to any limitation. An individual connection line between blocks in the drawings, etc., referred to in the following description includes both one-way and two-way directions. A one-way arrow schematically illustrates a principal signal (data) flow and does not exclude bidirectionality.

FIG. 1 is a diagram illustrating an example of a schematic configuration of an attack route extraction system 500 according to an example embodiment of the present invention. The attack route extraction system 500 according to the example embodiment of the present invention includes an attack graph generation part 510, a cost setting part 530, and an attack route extraction part 540.

First, an operation of the attack graph generation part 510 will be described. FIG. 2 is a diagram illustrating an outline of a system which performs a security risk diagnosis of a system to be diagnosed. Configuration information of a system 110 to be diagnosed is collected (120) and system information 130 is extracted, then a risk analysis 150 is performed by an inference engine 140 and an attack graph 160 is extracted.

Figure 3:
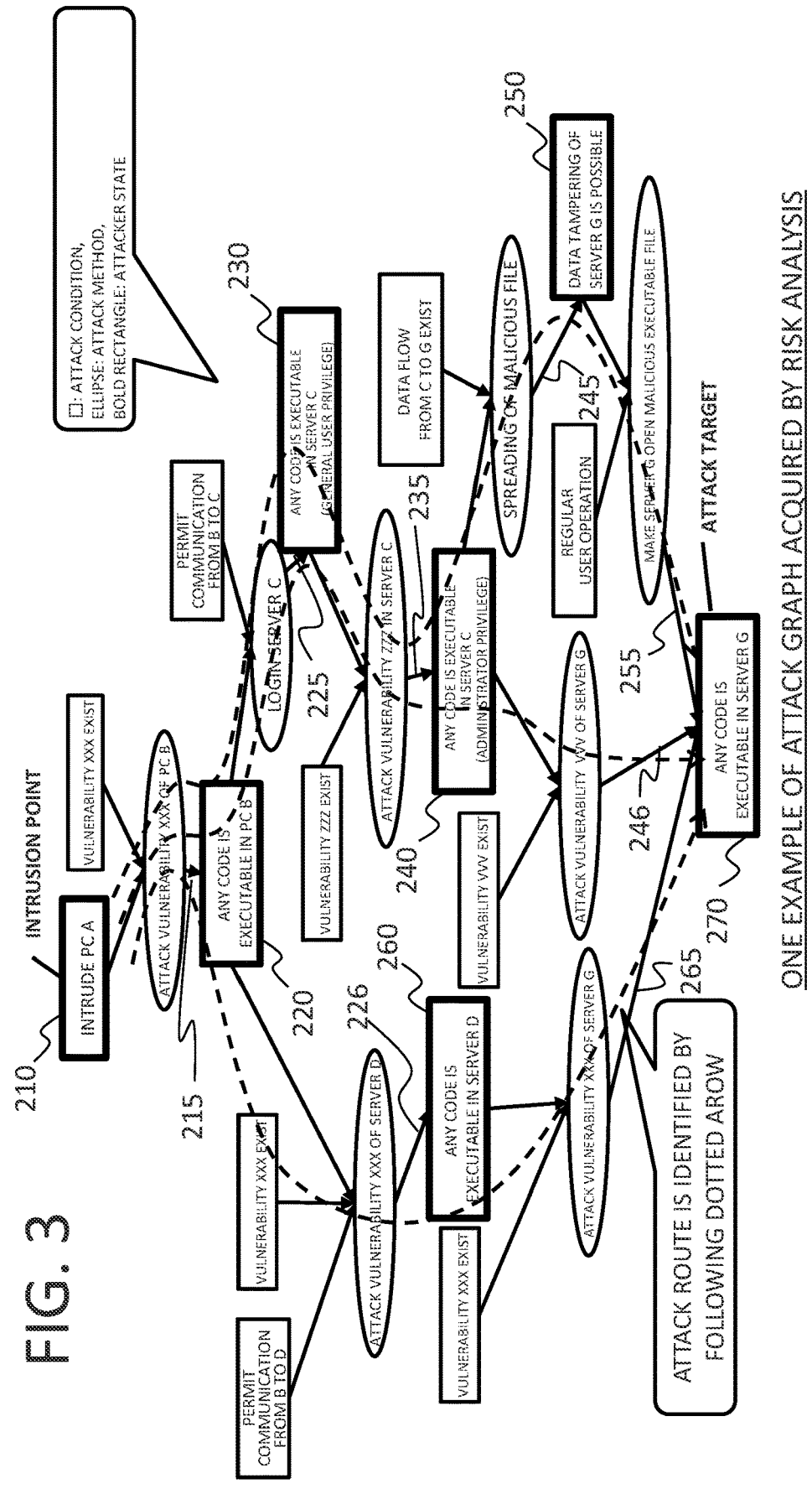
FIG. 3 is a diagram illustrating an example of an attack graph acquired by a risk analysis.

FIG. 3 is a diagram illustrating an example of an attack graph acquired by a risk analysis. In FIG. 3, parts surrounded by thin line rectangles denote attack conditions, parts surrounded by ellipses denote attack methods, and parts (nodes 210, 220, 230, 240, 250, 260, 270) surrounded by thick line rectangles denote states (nodes). Note, each stage in which a state is reached to a different state (node) by an attack method is called an attack step. An attack route is one acquired by concatenating each attack step (an edge indicating an attack method) as shown by broke lines of FIG. 3. That is, an attack graph is a chart or a diagrammatic representation showing flows (attack route) of possible combinations of each attack step.

Figure 4:
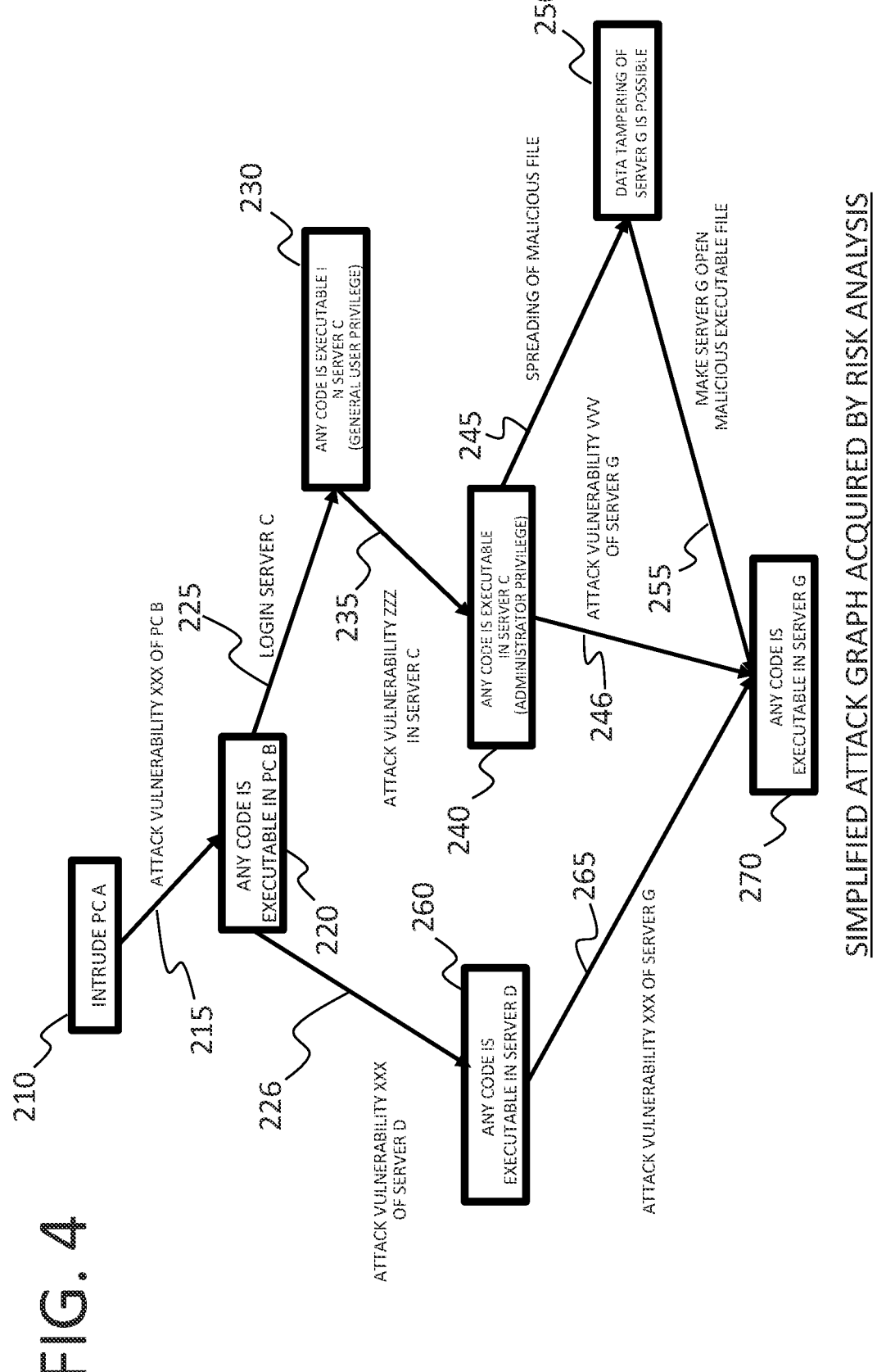
FIG. 4 is a diagram illustrating an example of a simplified attack graph.

FIG. 4 is a diagram illustrating an example of a simplified attack graph. In FIG. 4, elements denoted by the same reference numerals as those in FIG. 3 are the same elements. FIG. 4 illustrates an example of a simplified attack graph acquired by removing attack conditions surrounded by thin line rectangles other than states (nodes 210, 220, 230, 240, 250, 260, 270) surrounded by thick line rectangles from the attack graph as shown in FIG. 3 acquired by the risk analysis and by associating an attack method to each edge (215, 225, 226, 235, 245, 246, 255, 265). In the following description, a simplified attack graph is used by calling an attack graph for simplicity of the description and an attack method may be omitted appropriately.

Figure 5:
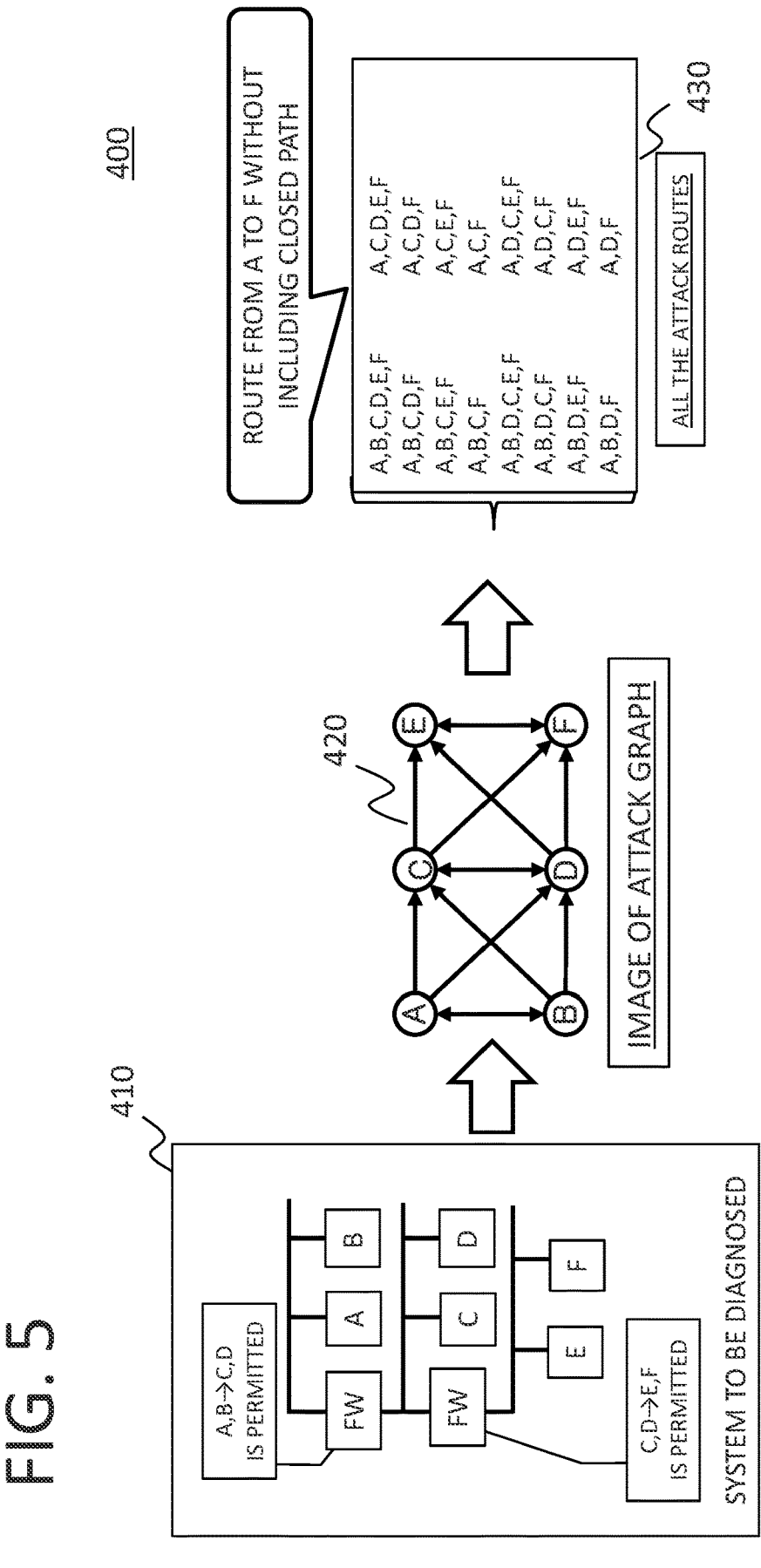
FIG. 5 is a diagram illustrating an example of a configuration of a system to be diagnosed, an example of an attack graph, all the attack routes, and a relationship thereamong.

FIG. 5 is a diagram illustrating an example of a configuration of a system to be diagnosed 410, an example of an image of an attack graph 420 corresponding thereto, all the attack routes 430, and a relationship 400 thereamong. In FIG. 5, A, B, C, D, E, and F in a system to be diagnosed 410 respectively denote hosts and FW denotes a firewall. A configuration is shown, in which A and B, C and D, and E and F are respectively connected by networks, there is a firewall between (A and B) and (C and D) and there is a firewall between (C and D) and (E and F), and an access from A or B to C or D are allowed and an access from C or D to E or F are allowed. The attack graph 420 has been extracted by analyzing configuration information of the system to be diagnosed 410, and attack source node and attack destination nodes A, B, C, D, E and F in an attack graph 420 correspond to the hosts A, B, C, D, E and F in the system to be diagnosed 410. The nodes A, B, C, D, E and F in the attack graph simply denote states to be reached by using any attack method on the corresponding hosts in the system to be diagnosed 410 (states in which code can be executed, and so on). All the attack routes 430 are all the attack routes which are extracted from the attack graph 420 by concatenating attack steps (edges), and each attack route is shown by enumerating nodes in a sequential order.

The attack graph generation part 510 of the attack route extraction system 500 generates an attack graph which shows each attack step corresponding to each edge denoting an attack method and a state (node) to be reached by the attack step according to the configuration information 501 of the system to be diagnosed which is supplied. That is, the attack graph generation part 510 is a functional part which extracts one or more attack steps that can be performed by a system to be diagnosed according to configuration information of the system to be diagnosed. For example, it generates the attack graph 420 from configuration information of the system to be diagnosed 410 as shown in FIG. 5. The cost setting part 530 sets a cost to each step of the attack graph based on at least one piece of information of threat information, attack content information, countermeasure possibility information based on countermeasure information corresponding to an attack method. The attack route extraction part 540 determines a priority of each attack route acquired by concatenating the one or more attack steps from an intrusion point to an attack target of the system to be diagnosed based on the cost of the attack method set by the cost setting part 530 and extracts the one or more attack route in a descending order of the priority.

According to the one example embodiment of the present invention, it is possible to extract one or more attack routes suitable for performing a security risk diagnosis from an attack graph without enumerating all the attack routes, by determining a priority of each attack route and by extracting attack routes based on priorities, from among all the attack routes included in an attack graph acquired from configuration information of a system to be diagnosed.

First Example Embodiment

Figure 6:
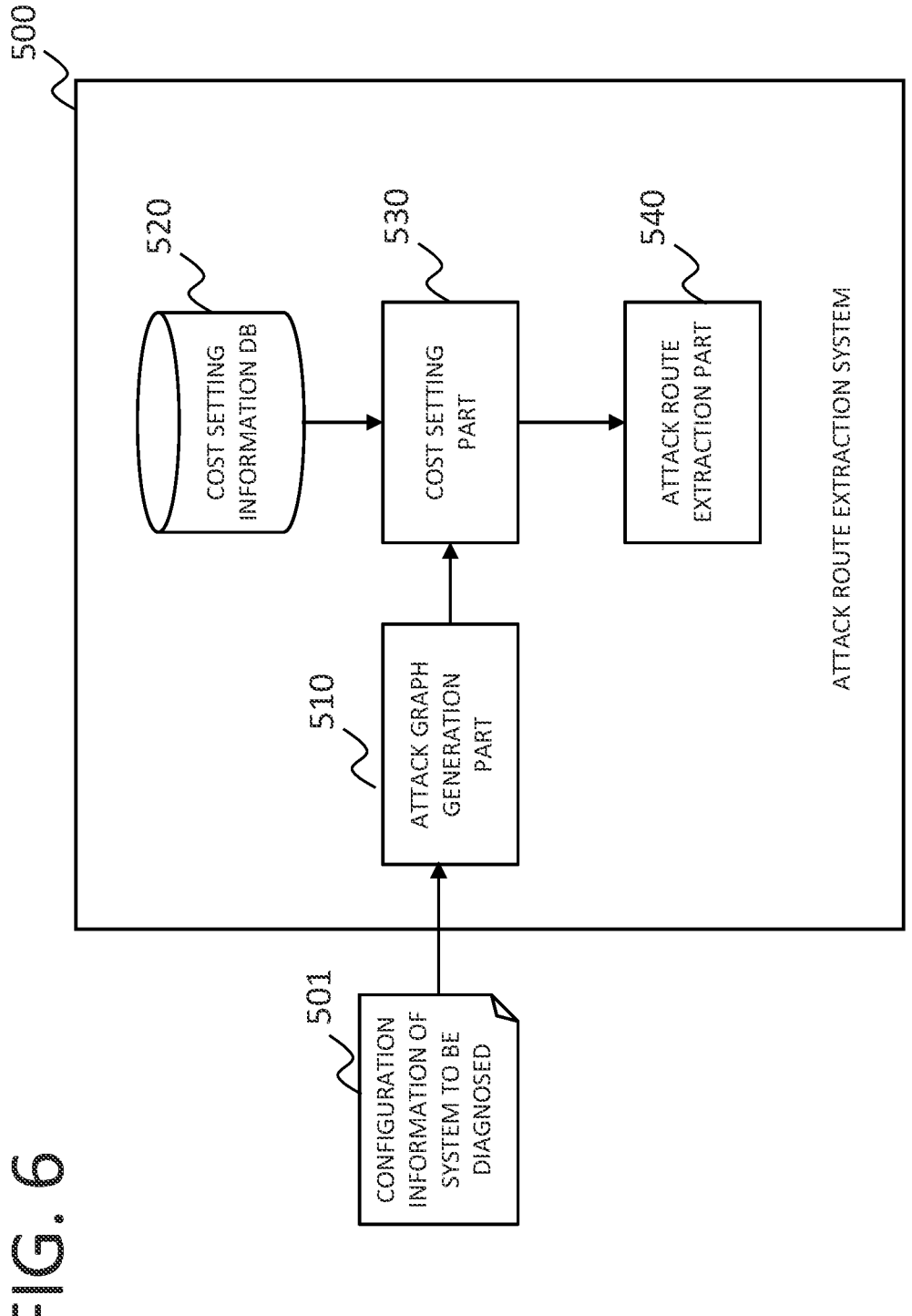
FIG. 6 is a diagram illustrating an example of a schematic configuration of an attack route extraction system according to a first example embodiment of the present invention.

Next, a configuration of an attack route extraction system according to a first example embodiment of the present invention will be described with reference to drawings. FIG. 6 is a diagram illustrating an example of a schematic configuration of an attack route extraction system according to the first example embodiment of the present invention. An attack route extraction system 500 according to the first example embodiment of the present invention includes an attack graph generation part 510, a cost setting information database (DB) 520, a cost setting part 530, and an attack route extraction part 540. An outline of an operation of the attack route extraction system 500 according to the first example embodiment of the present invention is described below.

The attack graph generation part 510 of the attack route extraction system 500 generates an attack graph which shows each attack step corresponding to each edge denoting an attack method and a state (node) to be reached by the attack step according to the configuration information 501 of the system to be diagnosed, which is inputted. For example, it generates the attack graph 420 from configuration information of the system to be diagnosed 410 as shown in FIG. 5. The cost setting information database (DB) 520 stores threat information and countermeasure information corresponding to an attack method. The cost setting part 530 extracts attack step information (attack content information) based on the attack graph and sets a cost to each edge of the attack graph based on at least one piece of information of threat information, attack content information, and countermeasure possibility information based on countermeasure information corresponding to an attack method. The attack route extraction part 540 determines a priority of each attack route from an intrusion point to an attack target of the system to be diagnosed based on the cost of each edge set by the cost setting part 530 and extract the one or more attack route in a descending order of the priority. Note, a priority of each attack route may be determined, by the attack route extraction part 540, based on a value acquired by summing a cost of each edge on each attack route from an intrusion point to an attack target. Furthermore, the smaller the value acquired by summing a cost of each edge becomes, the higher a priority may be set.

Figure 7:
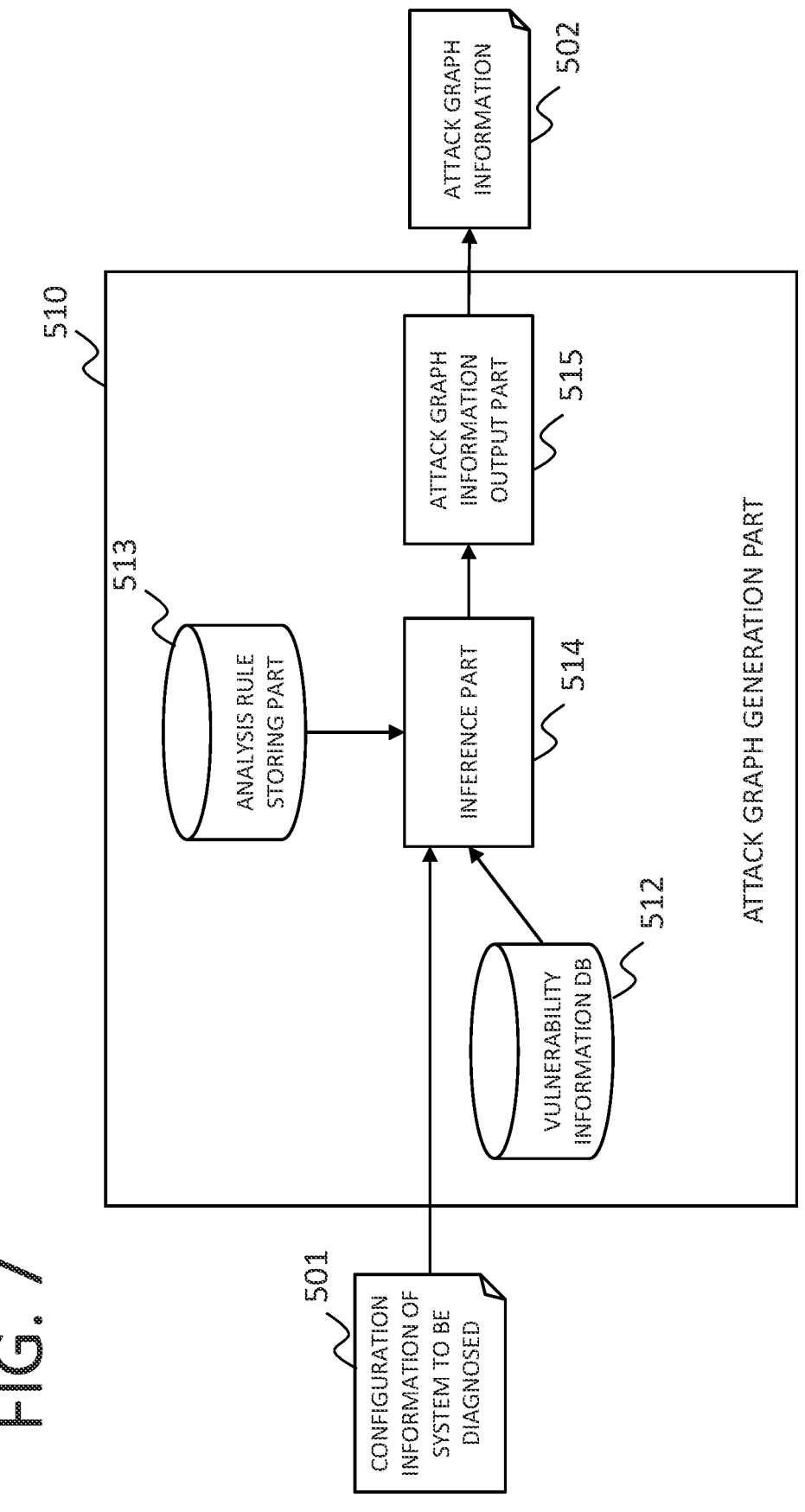
FIG. 7 is a diagram illustrating an example of a schematic configuration of an attack graph generation part of the attack route extraction system according to the first example embodiment of the present invention.

Next, a configuration of each part and operation thereof in the attack route extraction system 500 according to the first example embodiment of the present invention will be described in detail below. FIG. 7 is a diagram illustrating an example of a schematic configuration of an attack graph generation part 510 according to the first example embodiment of the present invention. The attack graph generation part 510 generates, for example, the attack graph 420 from the configuration information of the system to be diagnosed 410 as shown in FIG. 5.

The attack graph generation part 510 includes a vulnerability information database (DB) 512, an analysis rule storing part 513, an inference part 514, and an attack graph information output part 515. Collected configuration information of a system to be diagnosed 501 includes host information included in the system to be diagnosed, a network configuration, an OS (Operation System) or a software installed in each host, vulnerability information of each OS and software, and dataflow information. The vulnerability information DB 512 stores an attack condition of each vulnerability and an attack result, and so on. The analysis rule storing part 513 stores one or more analysis rules describing information about which attack can be performed under which condition. The inference part 514 infers what kind of attack can be performed from which host to which host based on collected configuration information 501 of a system to be diagnosed, an attack condition of each vulnerability stored in the vulnerability information database (DB) 512, attack results etc. and analysis rules stored in the analysis rule storing part 513. The attack graph information output part 515 outputs attack graph information 502 by concatenating information indicating what kind of attack can be performed from which host to which host which has been inferred by the inference part 514. As an example of the attack graph information 502, for example, may be the attack graph (simplified attack graph) as shown in FIG. 4.

FIG. 8 is a diagram illustrating an example of content of information stored in the cost setting information database (DB) 520 according to the first example embodiment of the present invention. The cost setting information database (DB) 520 stores vulnerability information 521, a threat level 523 corresponding to an attack method, and countermeasure information 522 corresponding to an attack method, and so on. Note, information included in the vulnerability information 521 and information included in the threat level 523 are called a threat information. Note, a vulnerability identifier (ID) of the vulnerability information 521 may be, for example, Common Vulnerabilities and Exposures (CVE). Note, a score of CVSS (Common Vulnerability Scoring System), presence or absence of an attack case, and presence or absence of PoC (Proof-of-Concept) code may be stored in associating with the vulnerability identifier (ID). In the threat level 523 corresponding to the attack method, a threat level may be set for each attack method. Furthermore, in the countermeasure information 522 corresponding to the attack method, an applicable countermeasure method may be prescribed for each attack method.

Figure 9:
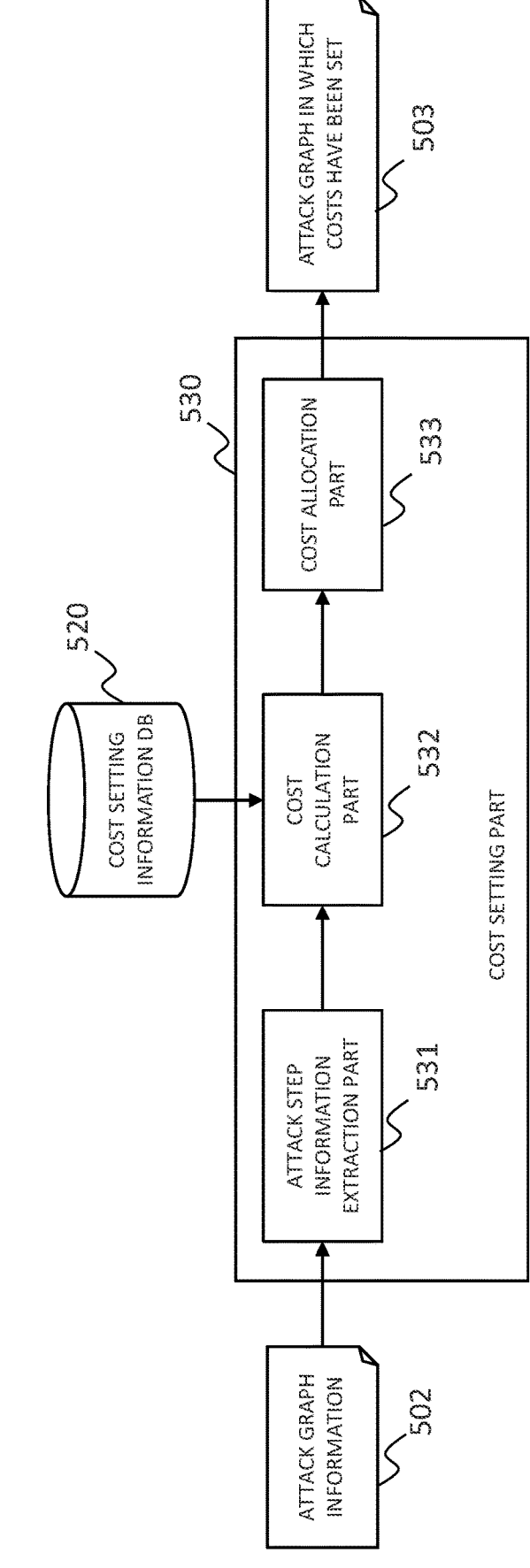
FIG. 9 is a diagram illustrating an example of a shematic configuration of a cost setting part of the attack route extraction system according to the first example embodiment of the present invention.

FIG. 9 is a diagram illustrating an example of a schematic configuration of the cost setting part 530 of the attack route extraction system 500 according to the first example embodiment of the present invention. The cost setting part 530 includes an attack step information extraction part 531, a cost calculation part 532, and a cost allocation part 533. The attack step information extraction part 531 is supplied with the attack graph information 502 outputted from the attack graph generation part 510 and extracts each attack step information (attack content information) included in the attack graph information 502. The cost calculation part 532 calculates a cost of each edge based on at least one of the attack content information extracted by the attack step information extraction part 531, the threat information stored in the cost setting information database (DB) 520, and the countermeasure possibility information based on countermeasure information 522 corresponding to an attack method. The cost allocation part 533 allocates and sets a cost calculated by the cost calculation part 532 to each edge of the attack graph, for example, as shown in FIG. 4 and outputs an attack graph 503 in which costs have been set. Setting of a cost of each edge will be described in detailed below.

Next, setting of a cost to each edge of an attack graph based on the threat information, attack content information, the countermeasure possibility information based on countermeasure information 522 corresponding to an attack method will be described in sequence. Note, in the following description, in setting a cost of each edge, a cost of an attack step (an edge of an attack graph) which is preferable to be outputted preferentially is set to be low. However, such setting of a cost is not intended to any limitation.

[1. Setting of a Cost Based on Threat Information, and so On]

First, setting of a cost of each edge of an attack graph based on threat information, and so on will be described. In setting of a cost based on threat information, a more dangerous attack route is preferentially extracted than others. As shown in FIG. 8, vulnerability information 521 and a threat level 523 corresponding to an attack method are stored in the cost setting information DB 520 and a cost of each edge of an attack graph is set by the cost allocation part 533 of the cost setting part 530 based on vulnerability information 521 and a threat level 523 corresponding to an attack method as described below.

(1-1) Setting of a Cost Based on Vulnerability Information (CVSS Score)

The higher a CVSS score corresponding to vulnerability ID of each edge is, the lower a cost of each edge is set.

(1-2) Setting of a Cost Based on Presence or Absence of an Attack Case

In a case where there is an attack case corresponding to vulnerability ID of each edge, a cost of each edge is set to be low.

(1-3) Setting of a Cost Based on Presence or Absence of a PoC Code (Proof-of-Concept Code)

In a case where there is a PoC code corresponding to vulnerability ID of each edge, a cost of each edge is set to be low.

(1-4) Setting of a Cost Based on Threat Level of an Attack Method

For a threat level 523 corresponding to an attack method, a threat level is set for each attack method. The higher a threat level of an attack method corresponding each edge is, the lower a cost of each edge is set.

[2. Extraction of Attack Content Information]

Figure 10:
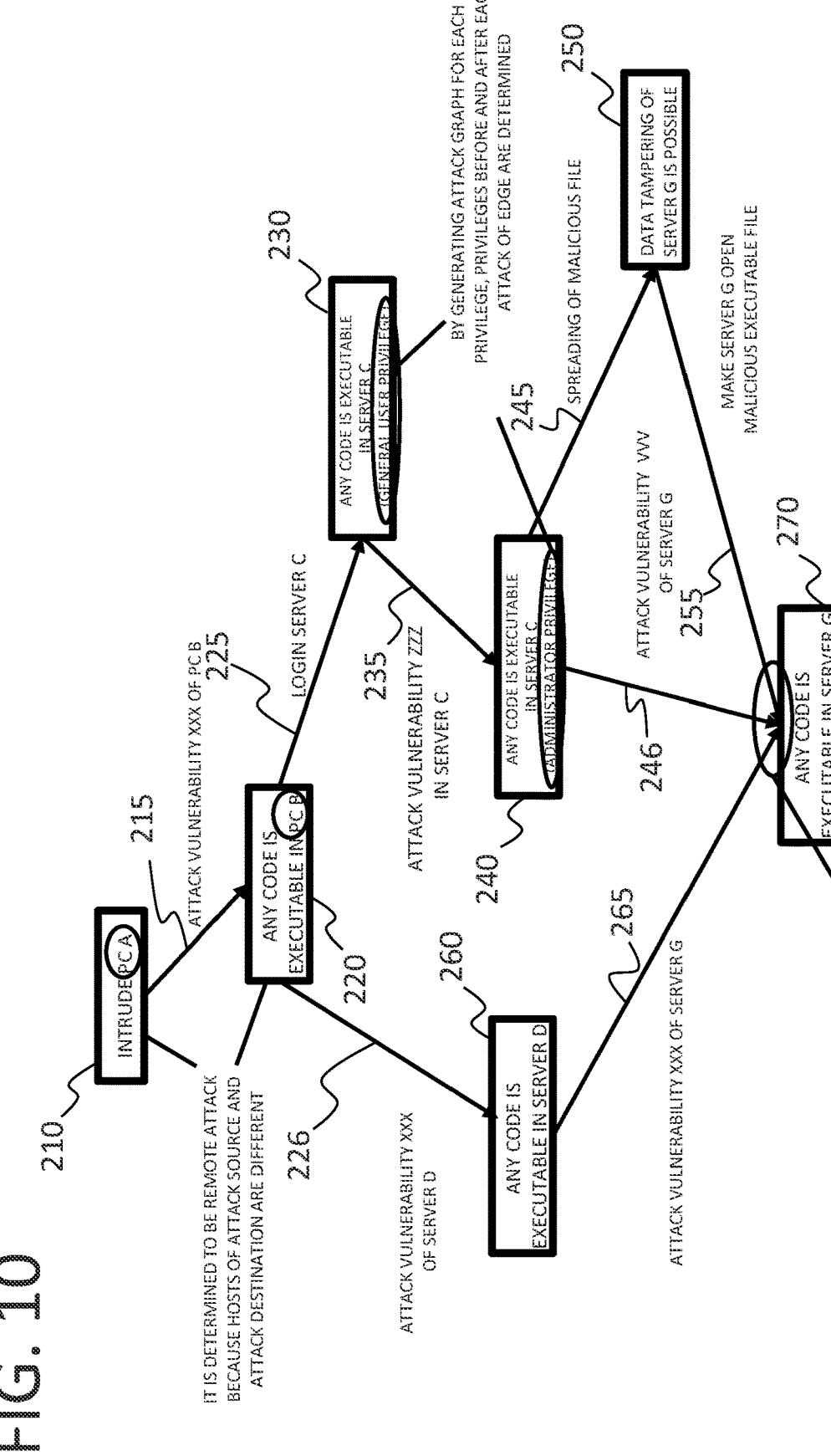
FIG. 10 is a diagram illustrating an example of an outline of extracting attack content information using an attack graph by the cost setting part according to the first example embodiment of the present invention.

Next, an example of an outline of an operation to extract attack step information (attack content information) using an attack graph will be described prior to description of setting a cost based on the attack content information. FIG. 10 is a diagram illustrating an example of an outline of an operation to extract attack step information (attack content information) using an attack graph by an attack step information extraction part 531 of the cost setting part 530. Note, an attack graph as shown in FIG. 10 shows the same attack graph as an attack graph shown in FIG. 4 for simplicity of the description.

(2-1) Determination of an Attack Condition

In an attack graph as shown in FIG. 10, from a part of the attack graph which describes that a PC A (node 210) is intruded, vulnerability XXX of a PC B is attacked (edge 215), and any code is executable in PC B (node 220), it is determined that the attack step of the edge 215 is a remote attack because a host (PC A) of an attack source and a host (PC B) of an attack destination are different from each other.

(2-2) Determination of Privileges Before and After Each Attack Step

Furthermore, in the attack graph as shown in FIG. 10, from a part of the attack graph which describes that any code is executable in a server C (general user privilege) (node 230), vulnerability ZZZ is attacked in the server C (235), and any code is executable in the server C (administrator privilege) (node 240) privileges before and after each attack of the edge 235 are determined, by generating an attack graph in which each node is separated for each privilege.

(2-3) Determination of Attack Scenario Information

Furthermore, in the attack graph as shown in FIG. 10, from a part of the attack graph which describes that any code is executable in a server C (administrator privilege) (node 240), vulnerability VVV of a server G is attacked (edge 246), and any code is executable in a server G (node 270), it is determined that the attack by the edge 246 connected to the last node 270 of the attack graph is an attack step whose attack destination is an attack target (node 270). As described above, the attack step information extraction part 531 of the cost setting part 530 can extract attack step information (attack content information) using an attack graph.

[3. Setting of a Cost Based on Attack Content Information]

Next, setting of a cost based on attack content information will be described. In setting of a cost based on attack content information, the more natural an attack route is, the more preferentially the attack route is extracted (a natural attack route is a route which is simple or consistent). Based on attack content information extracted using an attack graph as described above, a cost of each edge of the attack graph is set by the cost allocation part 533 of the cost setting part 530 as described below.

(3-1) Setting of a Cost Based on Attack Condition (Remote or Local)

As a result of extraction of attack content information using an attack graph, when it is determined that an attack condition is a remote attack, a higher cost is set in a case of the remote attack (attack from other host) than that in a case of a local attack (attack within the same host).

(3-2) Setting of a Cost Based on Attack Scenario Information

As a result of extraction of attack content information using an attack graph, in a case where an attack destination is an attack target, a cost is set to be low.

(3-3) Setting of a Cost Based on an Attack Destination Host

By adding a tiny cost based on an identifier of an attack destination host, a cost is set in such way that the same host is easily selected when other condition is the same.

(3-4) Setting of a Cost Based on Privileges Before and After an Attack by Each Attack Step As a result of extraction of each attack step information using an attack graph, the lower a privilege necessary for an attack source host before the attack step is, the lower a cost is set. Furthermore, the higher a privilege for executable after the attack by the attack step is, the lower a cost is set. Particularly, it is desirable to set in a way that an extracted attack route becomes natural.

Figure 11:
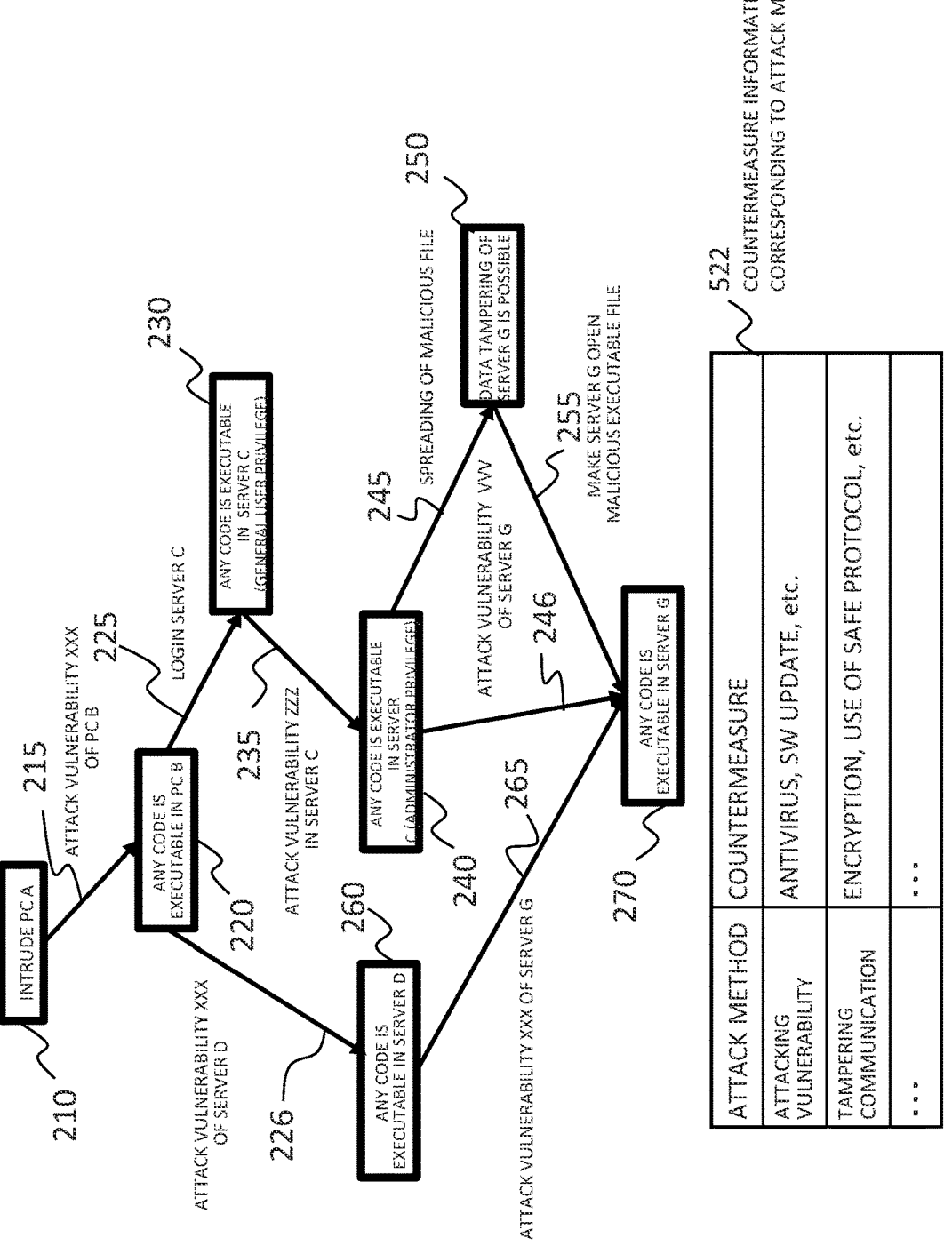
FIG. 11 is a diagram illustrating an outline of extracting countermeasure possibility information using an attack graph by the cost setting part according to the first example embodiment of the present invention.

Next, an outline of an operation to extract countermeasure possibility information based on countermeasure information 522 corresponding to an attack graph and an attack method by a cost calculation part 532 of a cost setting part 530 will be described prior to description of setting a cost based on the countermeasure possibility information. FIG. 11 is a diagram illustrating an outline of extracting countermeasure possibility information using an attack graph by the cost setting part 532 according to the first example embodiment of the present invention. The countermeasure possibility information can be extracted, for example, using an attack graph as shown in FIG. 11 and countermeasure information 522 corresponding to an attack method stored in a cost setting information DB 520. Note, the attack graph as described in FIG. 11 is the same attack graph as an attack graph shown in FIG. 4 and countermeasure information 522 corresponding to an attack method as shown in FIG. 11 is the same as countermeasure information 522 corresponding to an attack method shown in FIG. 8.

[4. Outline of Extraction Operation of Countermeasure Possibility Information]

(4-1) Extraction of a Number of Applicable Countermeasures

A number of applicable countermeasures corresponding to an attack method of each edge of an attack graph is calculated, as countermeasure possibility information, based on countermeasure information 522 corresponding to an attack method stored in a cost setting information DB 520. In an example as shown in FIG. 11, in a case where an attack method is "attacking vulnerability", countermeasures are such as "introduction of antivirus software", "software (SW) update", and so on. In this case, let the number of the countermeasure thereof be a number of applicable countermeasures corresponding to the attack method of an edge. Furthermore, in the example as shown in FIG. 11, in a case where an attack method is "tampering communication", countermeasures are such as "encryption", "use of a safe protocol", and so on. In this case, let the number of the countermeasure thereof be a number of applicable countermeasures corresponding to the attack method of an edge.

(4-2) Extraction of a Number of Appearance Times of the Same Attack Methods in an Attack Graph As countermeasure possibility information, how many times the same attack methods appear for each edge of the attack graph is counted. In an attack graph as shown in FIG. 11, each corresponding number of times of each attack method below appears.

attacking vulnerability: 5 times (edges 215, 226, 235, 246, 265)

normal login: once (edge 225)

spreading of malicious file: once (edge 245)

execution of malicious file: once (edge 255)

(4-3) Extraction of a Number of Appearance Times of Attack Methods to which the Same Countermeasure is Applicable As countermeasure possibility information, for each edge of an attack graph, a number of appearance times of attack methods against which the same countermeasure is applicable is extracted. It is calculated based on content of countermeasure information 522 corresponding to the attack method stored in a cost setting information DB 520 corresponding to an attack method indicated to each edge of the attack graph. In the first example embodiment, for example, in the following description, it is described that it is possible to apply countermeasures against both attacking vulnerability and execution of malicious file by introducing an anti-virus software. However, it is not intended to any limitation. For example, in FIG. 11, attacking methods against which introduction of an antivirus software is applicable are "attacking vulnerability" five times and "execution of malicious file" once, for a total of six times. In FIG. 11, it is counted that each attack method below appears by each corresponding number of times.

attacking vulnerability: 6 times normal login: once spreading of malicious file: once execution of malicious file: 6 times (4-4) Extraction of a Number of Appearance Times of Combinations of an Attack Destination Host and an Attack Method As countermeasure possibility information, it is extracted how many times a combination of an attack destination host and an attack method appears in an attack graph. In an attack graph as shown in FIG. 11, for example, it is counted that each combination below appears each corresponding number of times. In the following description, a combination of an attack source host and an attack method is denoted {an attack method, an attack source host}.

{attacking vulnerability, PC B}: once (edge 215 and node 220

{attacking vulnerability, server C}: once (edge 235 and node 240)

{attacking vulnerability, server D}: once (edge 226 and node 260)

{attacking vulnerability, server G}: 2 times (edge 246 and node 270, edge 265 and node 270)

{normal login, server C}: once (edge 225 and node 230)

{spreading of malicious file, server G}: once (edge 245 and node 250)

{execution of malicious fie, server G}: once (edge 255 and node 270)

(4-5) Extraction of an Indegree of an Attack Destination Node

As countermeasure possibility information, an indegree of an attack destination node is extracted in an attack graph. In an attack graph as shown in FIG. 11, each indegree for a combination of attack destination node and an attack method therefor appears a corresponding number of times as described below.

attacking vulnerability XXX of a PC B: entry once (node 220)

attacking vulnerability XXX of a server D: entry once (node 260)

Login server C: entry once (node 230)

attacking vulnerability ZZZ of a server C: entry once (node 240)

attacking vulnerability XXX of a server G: entries three times (node 270)

attacking vulnerability VVV of a server G: entry three times (node 270)

spreading of a malicious file: entry one (node 250)

making a server G open a malicious executable file: entries three times (node 270)

[5. Setting of a Cost Based on Countermeasure Possibility Information]

A cost of each edge of an attack graph based on each of countermeasure possibility information extracted as described above is set by a cost allocation part 533, as an example, in a way as described below. In setting of a cost based on countermeasure possibility information, an attack route for which countermeasure is more easily adapted (a number of candidates of countermeasures is large or an effect of countermeasure is high) is preferentially extracted.

(5-1) Setting of a Cost Based on a Number of Applicable Countermeasures

Based on a number of applicable countermeasures as extracted above, the more a number of applicable countermeasures which can reduce risks of the attack method in an attack graph is, the higher a cost of an edge is set.

(5-2) Setting of a Cost Based on a Number of Appearance Times of the Same Attack Method in an Attack Graph Based on a number of appearance times of the same attack method in an attack graph as extracted above, the more a number of appearance times of the same attack method in the attack graph is, the lower a cost of an edge is set.

(5-3) Setting of a Cost Based on a Number of Appearance Times of Attack Methods to which the Same Countermeasure is Applicable Based on a number of appearance times of attack methods to which the same countermeasure is applicable as extracted above, the more a number of appearance times of attack methods in an attack graph which can reduce risks with the same countermeasure is, the lower a cost of an edge is set.

(5-4) Setting of a Cost Based on a Number of Appearance Times of Combinations of an Attack Destination Host and an Attack Method Based on a number of appearance times of combinations of an attack destination host and an attack method as extracted above, the more a number of appearance times of combinations of the same attack destination host and the same attack method in an attack graph is, the lower a cost of an edge is set.

(5-5) Setting of a Cost Based on an Indegree of an Attack Destination Node

Based on an indegree of an attack destination node as extracted above, the greater an indegree of an attack destination node in an attack graph is, the lower a cost of an edge is set. That is, an attack step (edge) associated to a node utilized by a lot of attacks is set to be prone to be selected.

Figure 12:
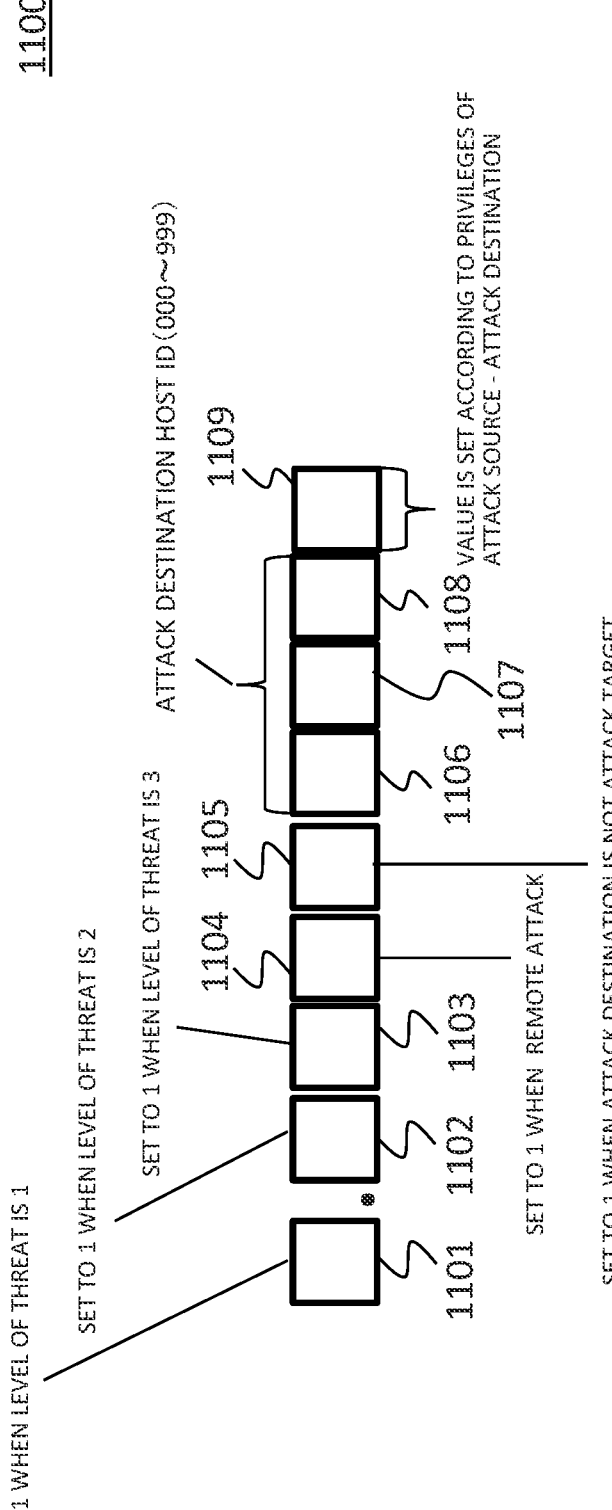
FIG. 12 is a diagram illustrating an examaple of a cost set by the cost setting part of the attack route extraction system according to the first example embodiment of the present invention.

FIG. 12 is a diagram illustrating an example of a cost of each edge set by the cost setting part 530 of the attack route extraction system 500 according to the first example embodiment of the present invention. The cost 1100 can be set, for example, by associating each element of cost setting with each digit of a decimal number.

A cost 1100 as shown in FIG. 12 illustrates an example in which a cost is set in a way that costs are set in each digit 1101 to 1103 of the cost 1100 based on threat information and costs are set in each digit 1104 to 1109 of the cost 1100 based on attack content information. Note, for example, it is assumed that each digit 1101 to 1109 of the cost 1100 is set to 0 (zero) as an initial state, but the present invention is not limited thereto.

By integrating vulnerability information (CVSS score) of threat information, presence or absence of an attack case, presence or absence of a PoC code (Proof-of-Concept code), and threat level of an attack method, it is possible to set a value to each digit 1101 to 1103 of the cost 1100 in FIG. 12 in a way that the digit 1101 is set to 1 when a level of a threat is 1, the digit 1102 is set to 1 when a level of a threat is 2, and the digit 1103 is set to 1 when a level of a threat is 3.

For example, a digit 1104 of the cost in FIG. 12 is set to 1 in a case of a remote attack based on an attack condition of attack content information, a digit 1105 is set to 1 in a case where an attack destination is not an attack target based on attack scenario information of attack content information. A tiny cost is set in digits 1106 to 1108 based on an identifier of an attack destination host of attack content information. Furthermore, a digit 1109 is set a value corresponding to privilege before and after an attack of attack content information. That is, a digit 1109 is set to 0 in a case where privileges of an attack source—an attack destination are a general user privilege—an administrator privilege, set to 1 in a case of an administrator privilege—an administrator privilege, set to 2 in a case of a general user privilege—a general user privilege, and set to 3 in a case of an administrator privilege—a general user privilege.

Figure 13:
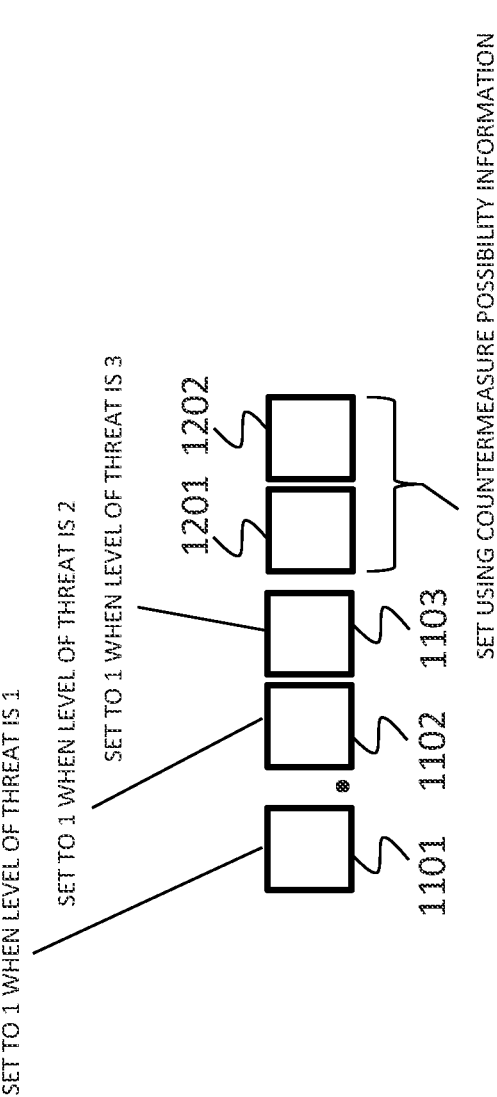
FIG. 13 is a diagram illustrating an another example of a cost set by the cost setting part of the attack route extraction system according to the first example embodiment of the present invention.

FIG. 13 is a diagram illustrating an another example of a cost set by the cost setting part 530 of the attack route extraction system 500 according to the first example embodiment of the present invention. A cost 1200 as shown in FIG. 13 illustrates an example in a case where a cost is set in each digit 1101 to 1103 of the cost 1200 based on a threat information and a cost is set in each digit 1201 to 1202 of the cost 1200 based on countermeasure possibility information. Note, in FIG. 13, the digits 1101 to 1103 of the cost 1200 are the same as those of the digits 1101 to 1103 of the cost 1100 set based on the threat information as shown in FIG. 12. In FIG. 13, the digit 1201 and 1202 of the cost 1200 may be set a cost using countermeasure possibility information. That is, a cost can be set based on any one of a number of applicable countermeasures, a number of appearance times of the same attack methods in an attack graph, a number of appearance times of attack methods to which the same countermeasure is applicable, a number of appearance times of combinations of an attack destination host and an attack method, and an indegree of a node, of countermeasure possibility information, or by combining some of countermeasure possibility information, or by integrating countermeasure possibility information. Note, in a case where the larger a number of times is, the higher a cost is set, a cost may be set to be a number of times by using 99 as upper limit. Otherwise, in a case where the larger a number of times is, the lower a cost is set, a cost may be set to be 100−(minus) a number of times by using 0 as lower limit. Note, a method to set a cost may be appropriately selectable based on an object of the present invention and a basic resolution principle irrespective of the above examples.

Figure 14:
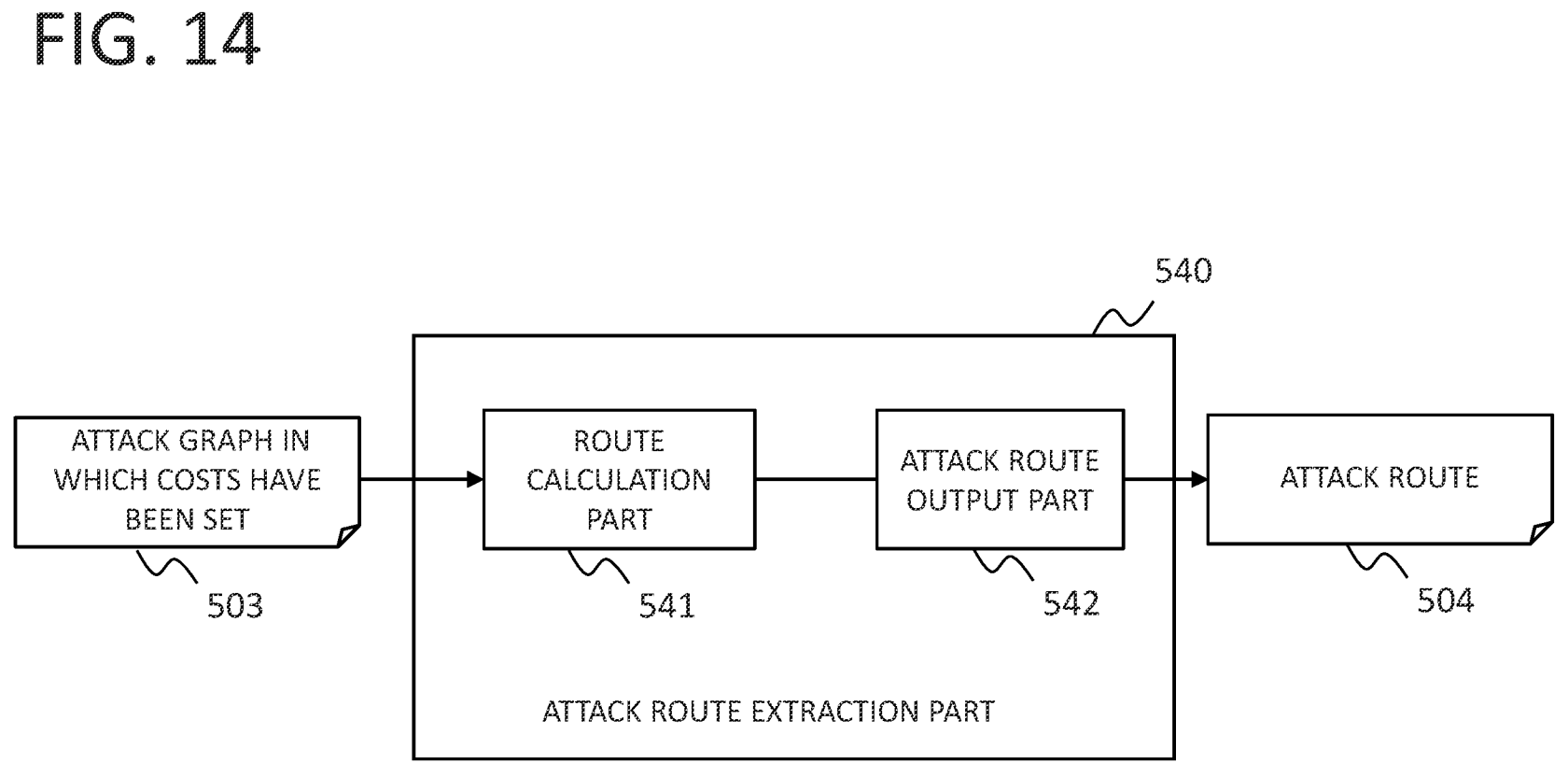

Next, an operation of an attack route extraction part 540 of the attack route extraction system 500 according to the first example embodiment of the present invention will be described. FIG. 14 is a diagram illustrating an example of a schematic configuration of an attack route extraction part 540 of the attack route extraction system 500 according to the first example embodiment of the present invention. The attack route extraction part 540 includes a route calculation part 541 and an attack route output part 542.

The route calculation part 541 of the attack route extraction part 540 as shown in FIG. 14 is supplied with the attack graph 503 in which costs have been set by the cost setting part 530 as shown in FIG. 9, adds costs of each edge on each attack route from an intrusion point to an attack target based on a cost set by the cost setting part 530 of each edge which connects a node to a node on an attack graph, and determines a degree of priority (an order of priority) in ascending order of added values. The attack route output part 542 outputs a determined number of attack routes to which priorities are determined according to the priorities, that is, in a descending order of the priorities, as attack routes.

Figure 15:
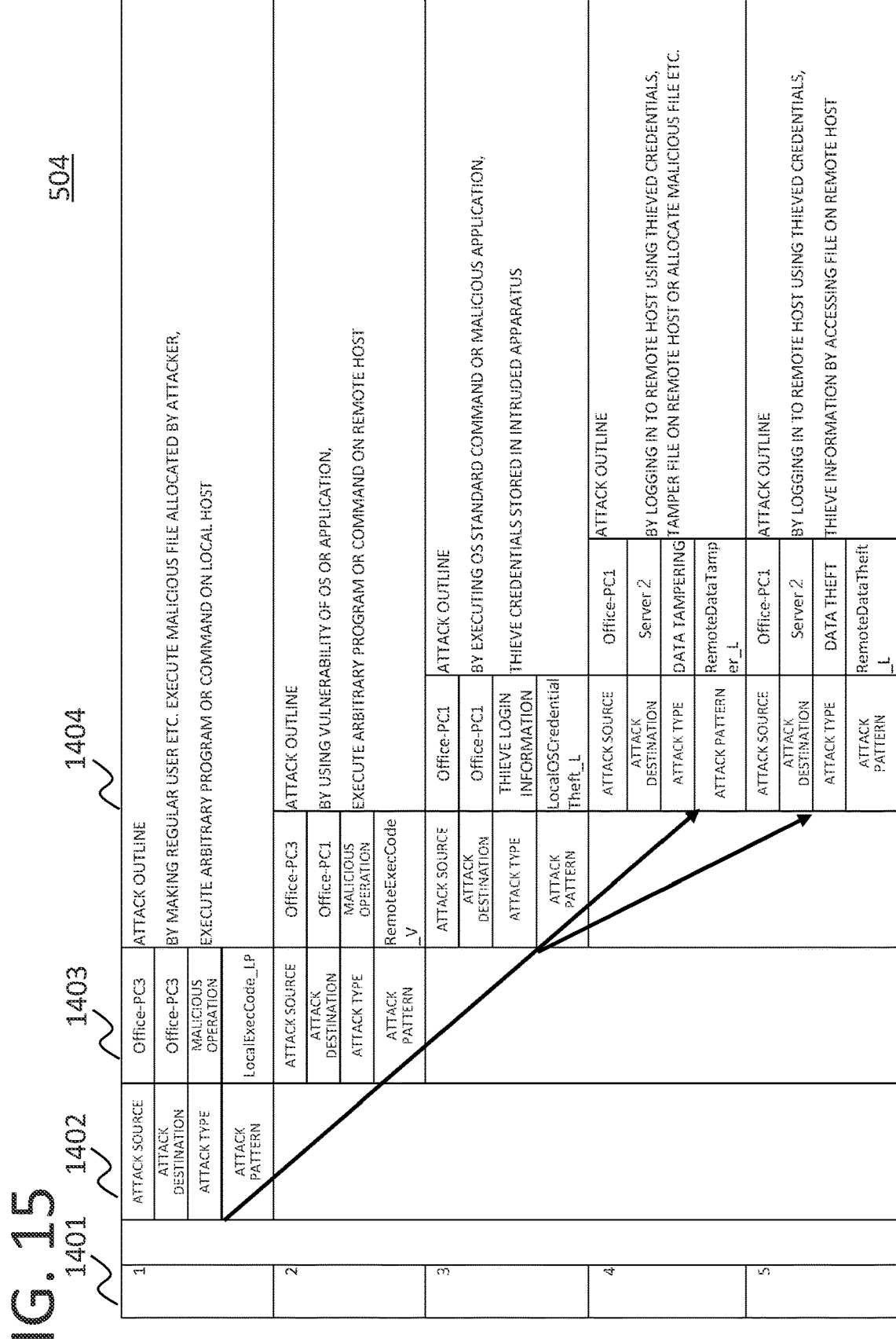
FIG. 15 is a diagram illustrating an output image of an attack route of the attack route extraction system according to the first example embodiment of the present invention.

FIG. 15 is a diagram illustrating an output image of a tabular form of an attack route 504 of the attack route extraction system according to the first example embodiment of the present invention. The output image of a tabular form as shown in FIG. 15 includes, as an example, a column 1401 indicating an attack number, a column 1402 indicating an information type concerning an attack, a column 1403 indicating concrete information content for an information type, and a column 1404 indicating an outline of an attack. In FIG. 15, an arrow indicates progression of an attack, and an attack route is illustrated by shifting each column 1402 to 1404 in a right direction as the attack progresses as shown by the arrow. Furthermore, in a case where different attack routes shares the same route partway, different attack routes are illustrated by branching as shown by branching arrows. FIG. 15 illustrates that it is possible to attack from a number 3 to a number 4 indicated in the leftmost column 1401 of the tabular form and to attack from a number 3 to a number 5 thereof.

According to the attack route extraction system according to the first example embodiment of the present invention, it is possible to extract one or more attack routes suitable for performing a security risk diagnosis from an attack graph, by setting a cost of each attack route, determining a priority of each attack route and extracting attack routes based on priorities, from among all the attack routes included in an attack graph acquired from configuration information of a system to be diagnosed, without enumerating all the attack routes.

Second Example Embodiment

Figure 16:
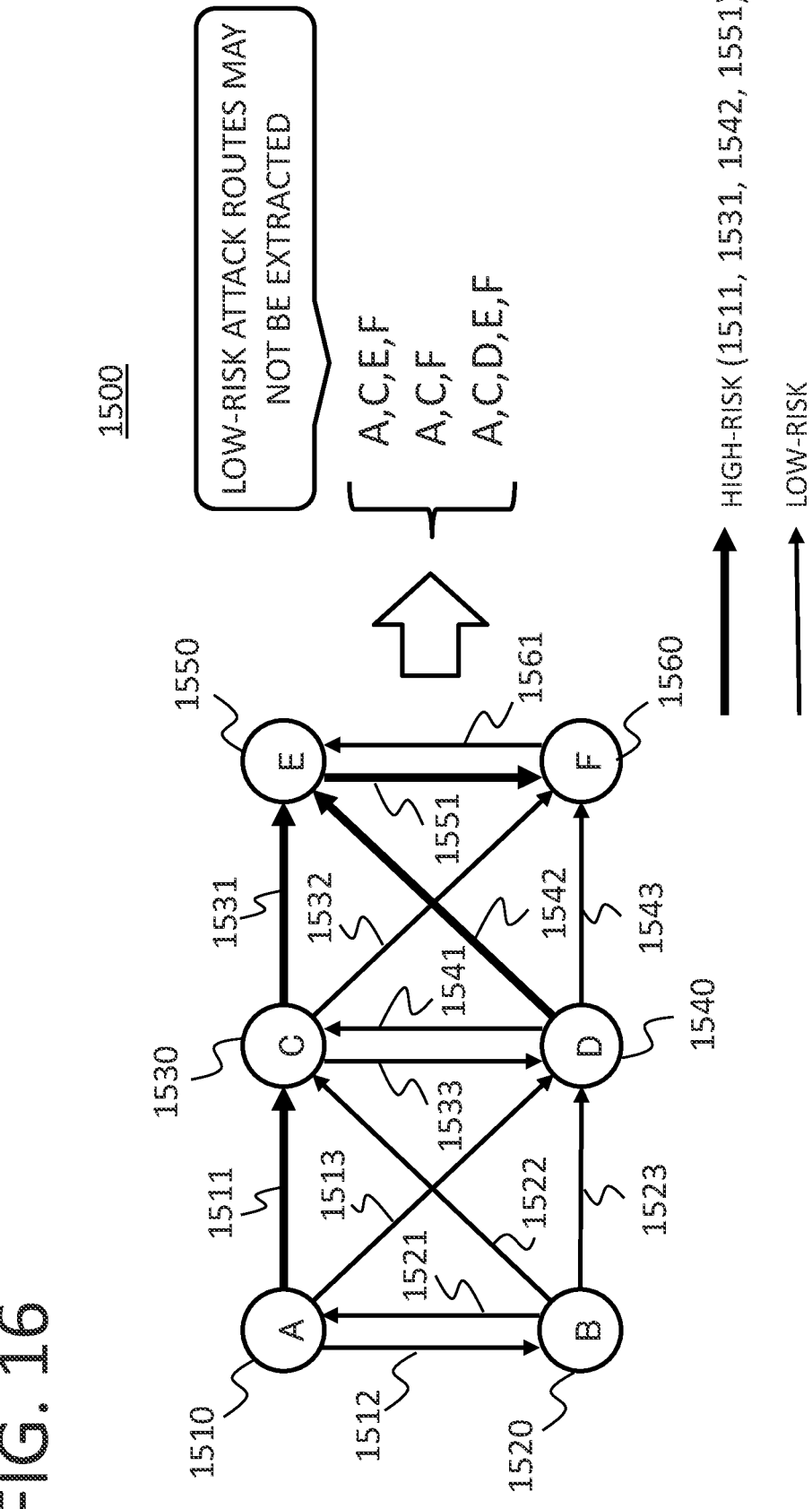
FIG. 16 is a diagram illustrating an example of a result of extracting an attack route from an attack graph according to a second example embodiment of the present invention.

Next, a configuration of an attack route extraction system according to a second example embodiment of the present invention will be described with reference to drawings. FIG. 16 is a diagram illustrating an example of a result of extracting an attack route from an attack graph according to the second example embodiment of the present invention. In FIG. 16, when extracted routes are biased towards particular high risk attack routes, whereby attack routes each using low-risk attack steps may result in not to be detected. For an example, in FIG. 16, it is assumed that routes of each edge of a node A to a node C (edge 1511), a node C to a node E (edge 1531), a node E to a node F (edge 1551), and a node D to a node E (edge 1542) indicated by thick line arrows are high-risk routes. In this case, although a route including nodes A, C, E, and F, a route including nodes A, C, and F, and a route including nodes A, C, D, E, and F, of a high risk, are detected, other low-risk routes may not be detected.

Figure 17:
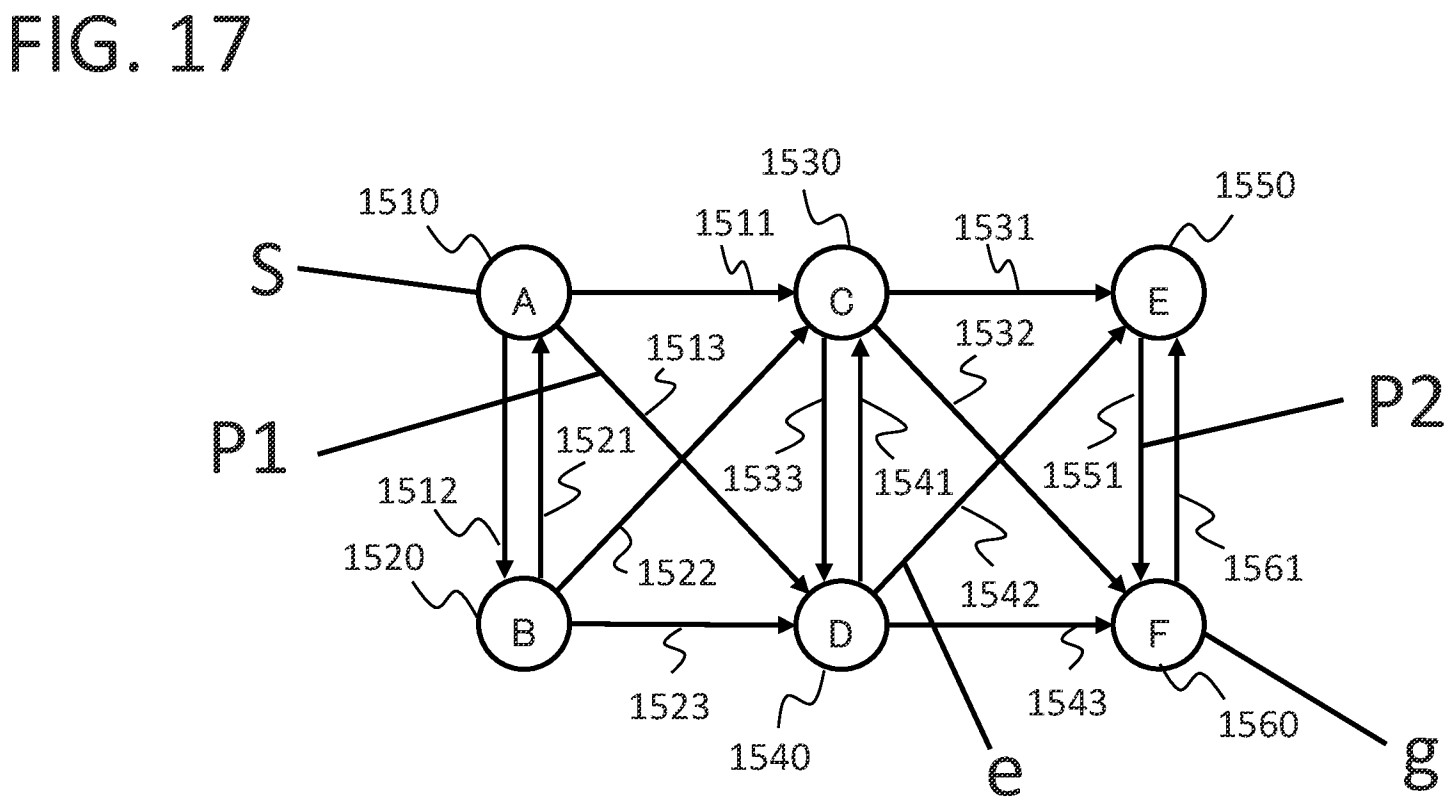

FIG. 17 is a diagram illustrating an outline of a method for extracting an attack route according to the second example embodiment of the present invention. The second example embodiment of the present invention is an example embodiment that, for each of attack steps, an attack route which uses the attack step is extracted, in extracting attack routes. The present algorithm operates as described below.

Step (1)

For each edge e={v1, v2} in an attack graph, operations of a step (2) and a step (3) below are executed. Note, FIG. 17 is a diagram illustrating an algorithm below for an edge e={v1, v2}, when let v1 be a node D and let v2 be a node E. Furthermore, in the following description, a cost set to each edge by using the first example embodiment is used for a calculation of a shortest route and it is assumed that the shortest route represents a minimum cost route calculated by using a cost.

Step (2)

A shortest route P which passes through the edge e from an intrusion point s (node A) to an attack target g (node F) is calculated. The step (2) includes a step (2-1) to a step (2-3) below.

Step (2-1)

A shortest path P1 from the intrusion point s (node A) to v1 which does not include g (node F) is calculated. As a result, if there exists no shortest path P1, it is determined that there is no shortest path P which passes through the edge e.

Step (2-2)

A shortest path P2 from v2 to g (node F) which does not include nodes included in P1 is calculated. If there exists no shortest path P2, it is determined that there exists no shortest path P which passes through the edge e.

Step (2-3)

If there exists a shortest path P which passes through the edge e, let the shortest path passing through the edge e be P={P1, e, P2} in step (2-3).

Step (3)

Finally, the shortest path P is added to a set of attack routes.

As described above, according to the second example embodiment, it is possible that all attack steps which may be utilized for attacks can be included in any attack route.

Third Example Embodiment

Next, an algorithm of a third example embodiment will be described. In the algorithm of the present third example embodiment, in the calculation of the shortest paths P1 and P2 of the above second example embodiment, different cost settings may be utilized. That is, in extraction of attack routes for each edge e, cost setting can be changed. For example, by adding a step (4) for changing a cost to the algorithm as described below in the above second example embodiment, it is possible to restrain that use is biased towards particular high risk attack steps.

Step (1)

For each edge e={v1, v2} in an attack graph, operations of a step (2), a step (3) and a step (4) below are executed. Note, in the following description, a cost set to each edge by using the first example embodiment is used for a calculation of a shortest route and it is assumed that the shortest route represents a minimum cost route calculated by using a cost.

Step (2)

A shortest route P which passes through the edge e from an intrusion point s (node A) to an attack target g (node F) is calculated. The step (2) includes a step (2-1) to a step (2-3) below.

Step (2-1)

A shortest path P1 from the intrusion point s (node A) to v1 which does not include g (node F) is calculated. As a result, if there exists no shortest path P1, it is determined that there exists no shortest path P which passes through the edge e.

Step (2-2)

A shortest path P2 from v2 to g (node F) which does not include nodes included in P1 is calculated. If there exists no shortest path P2, it is determined that there exists no shortest path P which passes through the edge e.

Step (2-3)

If there exists a shortest path P which passes through the edge e, let the shortest path passing through the edge e be P={P1, e, P2} in step (2-3).

Step (3)

The shortest path P is added to a set of attack routes.

Step (4)

A cost A is added to a route of an edge included in the shortest path P. That is, a cost of each edge is changed to lower a priority of each edge included in the extracted shortest path (an attack route with a minimum cost).

According to the above third example embodiment as described above, it is possible to restrain that use is biased towards particular high risk attack steps.

The exemplary embodiments of the present invention have been described as above, however, the present invention is not limited thereto. Further modifications, substitutions, or adjustments can be made without departing from the basic technical concept of the present invention. For example, the configurations of the networks and the elements and the representation modes of the message or the like illustrated in the individual drawings are merely used as examples to facilitate the understanding of the present invention. Thus, the present invention is not limited to the configurations illustrated in the drawings. In addition, "A and/or B" in the following description signifies at least one of A or B.

Figure 18:
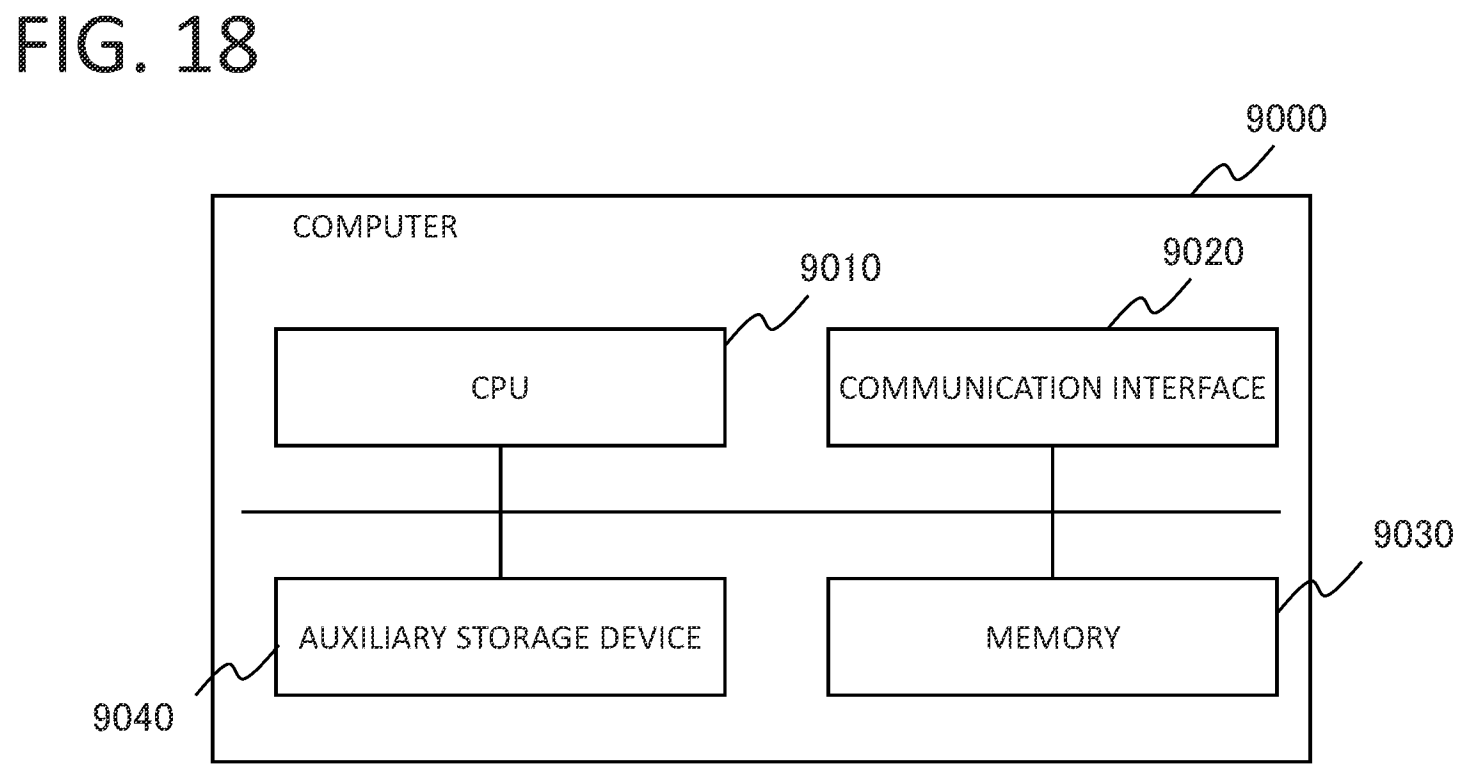

In addition, the procedures described in the above first to third example embodiments can each be realized by a program causing a computer (9000 in FIG. 18) functioning as the attack route extraction system 500 to realize the functions as the attack route extraction system 500. For example, this computer is configured to include a CPU (Central Processing Unit) 9010, a communication interface 9020, a memory 9030, and an auxiliary storage device 9040 in FIG. 18. That is, the CPU 9010 in FIG. 18 executes an attack route extraction program and performs processing for updating various calculation parameters stored in the auxiliary storage device 9040 or the like.

The memory 9030 is a RAM (Random Access Memory) or a ROM (Read-Only Memory), and so on.

That is, the individual parts (processing means, functions) of each of the attack route extraction system in the first to third example embodiments as described above can each be realized by a computer program that causes a processor of the computer to execute the corresponding processing described above by using corresponding hardware.

Finally, suitable modes of the present invention will be summarized.

[Mode 1]

(See the attack route extraction system according to the above first aspect)

[Mode 2]

The attack route extraction system according to mode 1 is preferable that, wherein the cost setting part extracts the attack content information based on an attack graph from which the one or more attack steps are extracted; and wherein the attack route extraction part determines a priority of each attack route based on a value acquired by adding a cost of each edge on each attack route from the intrusion point to the attack target.

[Mode 3]

The attack route extraction system according to mode 1 or 2 is preferable that, wherein the threat information includes at least one of vulnerability information, information about existence or non-existence of an attack case, information about existence or non-existence of PoC (Proof-of-Concept) codes and a threat level of an attack method.

[Mode 4]

The attack route extraction system according to any one of modes 1 to 3 is preferable that, wherein the attack content information includes at least one of an attack condition, attack scenario information, an identifier of an attack destination host and privileges before and after an attack by each attack step.

[Mode 5]

The attack route extraction system according to any one of modes 1 to 4 is preferable that, wherein the countermeasure possibility information includes at least one of a number of applicable countermeasures calculated based on the countermeasure information corresponding to the attack method, a number of appearances in an attack graph from which the one or more attack steps of the same attack method are extracted, a number of appearances of attack methods to which the same countermeasure is usable in the attack graph, a number of appearances of a combination of an attack destination host and an attack method in the attack graph, and an indegree to an attack destination node in the attack graph.

[Mode 6]

The attack route extraction system according to any one of modes 1 to 5 is preferable that, wherein the attack route extraction part further extracts, to each attack step of all the attack steps in an attack graph from which the attack step is extracted, an attack route with minimum cost which includes each of the attack steps but does not include overlapping attack steps.

[Mode 7]

The attack route extraction system according to mode 6 is preferable that, wherein a cost of each edge is changed to lower a priority of each of the edges included in the extracted attack route with a minimum cost.

[Mode 8]

(See the attack route extraction method according to the above second aspect)

[Mode 9]

The attack route extraction method according to mode 8 is preferable that, wherein the cost setting step includes a step of extracting the attack content information based on an attack graph from which the one or more attack steps are extracted; and wherein the attack route extraction step includes a step of determining a priority of each attack route based on a value acquired by adding a cost of each edge on each attack route from the intrusion point to the attack target.

[Mode 10]

(See the program according to the above third aspect)

The above modes 8 and 10 can be expanded to the modes 2 to 7 in the same way as the mode 1 is expanded.

The disclosure of each of the above PTLs is incorporated herein by reference thereto. Modifications and adjustments of the example embodiments or examples are possible within the scope of the overall disclosure (including the claims) of the present invention and based on the basic technical concept of the present invention. Various combinations or selections of various disclosed elements (including the elements in each of the claims, example embodiments, examples, drawings, etc.) are possible within the scope of the disclosure of the present invention. That is, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be construed to have been concretely disclosed.

REFERENCE SIGNS LIST 110, 410 system to be diagnosed
130 system information
140 inference engine
150 risk analysis
160, 420 attack graph
210, 220, 230, 240, 250, 260, 270 node
215, 225, 226, 235, 245, 246, 255, 265 edge
430 all the attack routes
500 attack route extraction system
501 configuration information of system to be diagnosed
502 attack graph information
503 attack graph in which costs have been set
510 attack graph generation part
512 vulnerability information database (DB)
513 analysis rule storing part
514 inference part
515 attack graph information output part
520 cost setting information database (DB)
521 vulnerability information
522 countermeasure information corresponding to attack method 523 threat level corresponding to attack method
530 cost setting part
531 attack step information extraction part
532 cost calculation part
533 cost allocation part
540 attack route extraction part
541 route calculation part
542 attack route output part
1100, 1200 cost
9000 computer
9010 CPU
9020 communication interface
9030 memory
9040 auxiliary storage device

What is claimed is:

1. An attack route extraction system, comprising:

at least one processor; and a memory in circuit communication with the processor, wherein the at least one processor is configured to execute program instructions stored in the memory to perform:

extracting one or more attack steps that can be performed by a system to be diagnosed according to configuration information of the system to be diagnosed;

setting a cost to an attack step based on countermeasure possibility information based on countermeasure information corresponding to an attack method; and determining a priority of each attack route acquired by concatenating the one or more attack steps from an intrusion point to an attack target of the system to be diagnosed based on the cost of the attack step set by the cost setting and extracting the one or more attack route in a descending order of the priority, wherein the countermeasure possibility information includes at least one of a number of applicable countermeasures calculated based on the countermeasure information corresponding to the attack method, a number of appearances in an attack graph from which the one or more attack steps of the same attack method are extracted, a number of appearances of attack methods to which the same countermeasure is usable in the attack graph, a number of appearances of a combination of an attack destination host and an attack method in the attack graph, an indegree to an attack destination node in the attack graph.

2. The attack route extraction system according to claim 1, wherein the setting the cost comprises extracting attack content information based on the attack graph from which the one or more attack steps are extracted; and wherein the determining the priority comprises determining a priority of each attack route based on a value acquired by adding a cost of each edge on each attack route from the intrusion point to the attack target.

3. The attack route extraction system according to claim 1, wherein the extracting the one or more attack steps comprises further extracting, to each attack step of all attack steps in the attack graph from which the attack step is extracted, an attack route with minimum cost which includes each of the attack steps but does not include overlapping attack steps.

4. The attack route extraction system according to claim 3, wherein a cost of each edge is changed to lower a priority of each edge included in the extracted attack route with the minimum cost.

5. An attack route extraction method performed by a computer including a processor and a memory, comprising:

extracting one or more attack steps that can be performed by a system to be diagnosed according to configuration information of the system to be diagnosed;

setting a cost to an attack step based countermeasure possibility information based on countermeasure information corresponding to an attack method; and determining a priority of each attack route acquired by concatenating the one or more attack steps from an intrusion point to an attack target of the system to be diagnosed based on the cost of the attack step set by the cost setting and extracting the one or more attack route in a descending order of the priority, wherein the countermeasure possibility information includes at least one of a number of applicable countermeasures calculated based on the countermeasure information corresponding to the attack method, a number of appearances in an attack graph from which the one or more attack steps of the same attack method are extracted, a number of appearances of attack methods to which the same countermeasure is usable in the attack graph, a number of appearances of a combination of an attack destination host and an attack method in the attack graph, an indegree to an attack destination node in the attack graph.

6. The attack route extraction method according to claim 5, wherein the setting the cost includes extracting attack content information based on the attack graph from which the one or more attack steps are extracted; and wherein the determining the priority includes determining a priority of each attack route based on a value acquired by adding a cost of each edge on each attack route from the intrusion point to the attack target.

7. The method according to claim 5, wherein the extracting the one or more attack steps comprises further extracting, to each attack step of all attack steps in the attack graph from which the attack step is extracted, an attack route with minimum cost which includes each of the attack steps but does not include overlapping attack steps.

8. The method according to claim 7, wherein a cost of each edge is changed to lower a priority of each edge included in the extracted attack route with the minimum cost.

9. A computer-readable non-transitory recording medium recording a program, the program which causes a computer to perform processings of:

extracting one or more attack steps that can be performed by a system to be diagnosed according to configuration information of the system to be diagnosed;

setting a cost to an attack step based on countermeasure possibility information based on countermeasure information corresponding to an attack method; and determining a priority of each attack route acquired by concatenating the one or more attack steps from an intrusion point to an attack target of the system to be diagnosed based on the cost of the attack step set by the processing of setting the cost and extracting the one or more attack route in a descending order of the priority, wherein the countermeasure possibility information includes at least one of a number of applicable countermeasures calculated based on the countermeasure information corresponding to the attack method, a number of appearances in an attack graph from which the one or more attack steps of the same attack method are extracted, a number of appearances of attack methods to which the same countermeasure is usable in the attack graph, a number of appearances of a combination of an attack destination host and an attack method in the attack graph, an indegree to an attack destination node in the attack graph.

10. The computer-readable non-transitory recording medium according to claim 9, wherein the processing of setting the cost comprises extracting attack content information based on the attack graph from which the one or more attack steps are extracted; and wherein the processing of determining the priority comprises determining a priority of each attack route based on a value acquired by adding a cost of each edge on each attack route from the intrusion point to the attack target.

* * * * *